(12) United States Patent
Holtcamp et al.

(10) Patent No.: US 11,712,687 B2
(45) Date of Patent: *Aug. 1, 2023

(54) CATALYST SYSTEMS AND POLYMERIZATION PROCESSES FOR USING THE SAME

(71) Applicant: ExxonMobil Chemical Patents Inc., Baytown, TX (US)

(72) Inventors: Matthew W. Holtcamp, Huffman, TX (US); Kevin A. Stevens, Houston, TX (US); Laughlin G. McCullough, League City, TX (US); David F. Sanders, Beaumont, TX (US); Subramaniam Kuppuswamy, Mont Belvieu, TX (US); Matthew S. Bedoya, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 280 days.

This patent is subject to a terminal disclaimer.

(21) Appl. No.: 17/071,696

(22) Filed: Oct. 15, 2020

(65) Prior Publication Data

US 2021/0023540 A1 Jan. 28, 2021

Related U.S. Application Data

(63) Continuation of application No. 16/206,480, filed on Nov. 30, 2018, now Pat. No. 10,926,250.

(Continued)

(51) Int. Cl.
*C08L 23/08* (2006.01)
*C08F 210/16* (2006.01)
*C08F 4/646* (2006.01)
*C08F 4/6592* (2006.01)
*B01J 31/22* (2006.01)
*B01J 31/14* (2006.01)
*B01J 31/16* (2006.01)

(Continued)

(52) U.S. Cl.
CPC ........ *B01J 31/2295* (2013.01); *B01J 31/143* (2013.01); *B01J 31/1608* (2013.01); *B01J 31/1616* (2013.01); *B01J 31/1815* (2013.01); *C08F 4/653* (2013.01); *C08F 210/14* (2013.01); *C08L 23/0815* (2013.01); *B01J 2531/0244* (2013.01); *B01J 2531/48* (2013.01); *B01J 2531/49* (2013.01); *B01J 2531/842* (2013.01); *B01J 2540/20* (2013.01); *C08F 4/65912* (2013.01); *C08F 4/65916* (2013.01); *C08F 4/65925* (2013.01); *C08F 4/7042* (2013.01); *C08F 210/16* (2013.01); *C08L 2207/066* (2013.01); *C08L 2314/06* (2013.01)

(58) Field of Classification Search
CPC ......................... C08L 23/0815; C08F 210/16; C08F 4/65904; C08F 4/65925; C08F 4/64089

See application file for complete search history.

(56) References Cited

U.S. PATENT DOCUMENTS

2009/0318640 A1  12/2009  Brant et al.
2011/0294969 A1  12/2011  Schmitz et al.

(Continued)

*Primary Examiner* — Caixia Lu
(74) *Attorney, Agent, or Firm* — ExxonMobil Technology and Engineering Company-Chemicals

(57) ABSTRACT

A catalyst system including the product of the combination of an unbridged Group 4 metallocene compound and a 2,6-bis(imino)pyridyl iron complex is provided. A process for the polymerization of monomers (such as olefin monomers) and a polymer produced therefrom are also provided.

18 Claims, 5 Drawing Sheets

Related U.S. Application Data

(60) Provisional application No. 62/593,694, filed on Dec. 1, 2017.

(51) Int. Cl.
  *B01J 31/18* (2006.01)
  *C08F 4/653* (2006.01)
  *C08F 210/14* (2006.01)
  *C08F 4/659* (2006.01)
  *C08F 4/70* (2006.01)

(56) References Cited

U.S. PATENT DOCUMENTS

| | | |
|---|---|---|
| 2013/0345378 A1 | 12/2013 | Hong et al. |
| 2015/0166778 A1 | 6/2015 | Fantinel et al. |
| 2016/0298795 A1 | 10/2016 | Vogt et al. |

CATALYST SYSTEMS AND POLYMERIZATION PROCESSES FOR USING THE SAME

CROSS-REFERENCE OF RELATED APPLICATIONS

This application is a continuation of U.S. Ser. No. 16/206,480, filed on Nov. 30, 2018, which in turn claimed the benefit of Ser. No. 62/593,694, filed on Dec. 1, 2017, and European Application No. 18152675.7, filed Jan. 22, 2018, the disclosures of which are incorporated herein by reference in their entireties.

FIELD OF THE INVENTION

The present disclosure relates to catalyst systems including the produce of the combination of an unbridged Group 4 indenyl metallocene catalyst and a 2,6-bis(imino)pyridyl iron complex. Catalyst systems can be used for olefin polymerization processes.

BACKGROUND OF THE INVENTION

Polymers, such as polyolefin polymers, are widely used commercially because of their robust physical properties. For example, various types of polyethylene polymers, including high density, low density, and linear low density polyethylene polymers, are some of the most commercially useful. Low density polyethylene is generally prepared at high pressures using free radical initiators. Low density polyethylene typically has a density of about 0.912-0.930 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene with a similar density that does not contain long chain branches is known as "linear low density polyethylene" ("LLDPE") and is typically produced with conventional Ziegler-Natta catalysts or with metallocene catalysts. "Linear" means that the polyethylene has few, if any, long chain branches and typically has a g'vis value of 0.97 or above, such as 0.98 or above. Polyethylenes having still greater density are the high density polyethylenes ("HDPEs"), e.g., polyethylenes having densities greater than 0.940 g/cm$^3$ and are generally prepared with Ziegler-Natta or chrome catalysts. Very low density polyethylenes ("VLDPEs") can be produced by a number of different processes yielding polyethylenes typically having a density 0.890 to 0.911 g/cm$^3$. Polyethylenes having a density of from 0.910 g/cm$^3$ to 0.935 g/cm$^3$ can also be referred to as having a medium density.

Copolymers of polyolefins, such as polyethylene copolymers, have a comonomer, such as hexene, incorporated into the polyethylene backbone. These copolymers provide varying physical properties compared to polyethylene alone and are typically produced in a low pressure reactor, utilizing, for example, solution, slurry, and/or gas phase polymerization processes. Polymerization may take place in the presence of catalyst systems such as those employing a Ziegler-Natta catalyst, a chromium based catalyst, and/or a metallocene catalyst.

These copolymers have a composition distribution, which refers to the distribution of comonomer in the copolymer, typically in the copolymer backbone. When the amount of comonomer varies among the copolymer molecules, the composition is said to have a "broad" composition distribution. When the amount of comonomer per 1000 carbons is similar among the copolymer molecules of different chain lengths, the composition distribution is said to be "narrow".

The composition distribution influences the properties of a copolymer composition, for example, stiffness, toughness, environmental stress crack resistance, optical properties, and heat sealing. The composition distribution of a polyolefin composition may be readily measured by, for example, Temperature Rising Elution Fractionation (TREF) or Crystallization Analysis Fractionation (CRYSTAF).

A composition distribution of a copolymer composition is influenced by the identity of the catalyst used to form the polyolefins of the composition. Ziegler-Natta catalysts and chromium based catalysts produce compositions with broad composition distributions, whereas metallocene catalysts typically produce compositions with narrow composition distributions.

Furthermore, polyolefins, such as polyethylenes, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition. As used herein, "high molecular weight" is defined as a weight average molecular weight (Mw) value of 100,000 g/mol or more. "Low molecular weight" is defined as an Mw value of less than 100,000 g/mol.

Useful bimodal polyolefin compositions include a first polyolefin having low molecular weight and a comonomer content (i.e., comonomer incorporated into the polyolefin backbone) while a second polyolefin has a high molecular weight and a comonomer content different than the comonomer content of the first polyolefin.

For example, a polyolefin composition can have a broad composition distribution that includes a first polyolefin having low molecular weight and low comonomer content while a second polyolefin has a high molecular weight and high comonomer content. Compositions having this broad orthogonal composition distribution (BOCD) in which the comonomer is incorporated predominantly in the high molecular weight chains can provide improved physical properties, for example toughness properties and environmental stress crack resistance (ESCR). As used herein, "low comonomer content" is defined as a polyolefin having 6 wt % or less of comonomer based upon the total weight of the polyolefin. As used herein, "high comonomer content" is defined as a polyolefin having greater than 6 wt % of comonomer based upon the total weight of the polyolefin.

Also like comonomer content, a composition distribution of a copolymer composition is dependent on the identity of the catalyst used to form the polyolefins of the composition. Ziegler-Natta catalysts and chromium based catalysts produce compositions with broad composition distributions (BCD), whereas metallocene catalysts typically produce compositions with narrow composition distributions (NCD).

Useful catalysts for olefin polymerization are often based on cyclopentadienyl transition metal catalyst compounds (metallocenes) as catalyst precursors combined with activators, typically an alumoxane or with an activator containing a non-coordinating anion. A typical metallocene catalyst system includes metallocene catalyst, activator, and optional support. Supported catalyst systems are used in many polymerization processes, often in slurry and/or gas phase polymerization processes. For example, U.S. Pat. No. 7,829,495 discloses Me$_2$Si(fluorenyl)(3-nPr-Cp)ZrCl$_2$ and U.S. Pat. No. 7,179,876 discloses supported (nPrCp)$_2$HfMe$_2$. Further, J. Stadelhofer, et al., discloses preparation of potassium cyclopentadienide (*J. Organomet. Chem.* 1975, 84, C$_1$-C$_4$). Likewise, Me$_2$C(Cp)(Me$_3$SiCH$_2$-Ind)MCl$_2$ and Me$_2$C(Cp)(Me, Me$_3$SiCH$_2$-Ind)MCl$_2$, where M is Zr or Hf have been synthesized and screened for the syndiospecific polymerization of propylene. (R. Leino, et al. *Macromolecules* 2001, 34, 2072-2082). However, these catalysts do not produce medium density polyethylene with high comonomer content. A medium density polyethylene with high comonomer content would be a polymer having, for example, high stiffness, high toughness, and good processability.

Furthermore, metallocenes are often combined with other catalysts, or even other metallocenes, to attempt to modify polymer properties, such as producing bimodal or broad molecular weight distribution polyolefins. See, for example, U.S. Pat. Nos. 8,088,867 and 5,516,848 (which disclose the use of two different cyclopentadienyl based transition metal compounds activated with alumoxane or non-coordinating anions). See, also, PCT/US2016/021748, filed Mar. 10, 2016, which discloses two metallocenes used to make ethylene copolymers.

Other background references include: Hong et al., *Polymer Engineering and Science*—2007, DOI 10.1002/pen, pages 131-139, published online in Wiley InterScience (www.interscience.wiley.com) 2007 Society of Plastics Engineers; J. Kim, et al., *J. Polym. Sci. Part A: Polym Chem.*, 2000, 38, 1427; P. D. Iedema, et al., *Ind. Eng. Chem. Res.*, 2004, 43, 36; U.S. Pat. Nos. 4,701,432; 5,032,562; 5,077,255; 5,135,526; 5,183,867; 5,382,630; 5,382,631; 5,525,678; 6,069,213; 6,207,606; 6,656,866; 6,828,394; 6,964,937; 6,956,094; 6,964,937; 6,995,109; 7,041,617; 7,119,153; 7,129,302; 7,141,632; 7,172,987; 7,179,876; 7,192,902; 7,199,072; 7,199,073; 7,226,886; 7,285,608; 7,312,283; 7,355,058; 7,385,015; 7,396,888; 7,595,364; 7,619,047; 7,662,894; 7,829,495; 7,855,253; 8,110,518; 8,138,113; 8,268,944; 8,288,487; 8,329,834; 8,378,029; 8,575,284; 8,598,061; 8,680,218; 8,785,551; 8,815,357; 8,940,842; 8,957,168; 9,079,993; 9,163,098; 9,181,370; 9,303,099; U.S. Publication Nos. 2017/0114167; 2004/0259722; 2006/275571; 2007/043176; 2010/331505; 2012/0130032; 2014/0031504; 2014/0127427; 2015/299352; 2016/0032027; 2016/075803; PCT Publication Nos. WO 97/35891; WO 98/49209; WO 00/12565; WO 2001/09200; WO 02/060957; WO 2004/046214; WO 2006/080817; WO 2007/067259; WO 2007/080365; WO 2009/146167; WO 2012/006272; WO 2012/158260; WO 2014/0242314; WO 2015/123168; WO 2016/172099; PCT Application No. PCT/US2016/021757, filed Mar. 10, 2016; EP 2 374 822; EP 2 003 166; EP 0,729,387; EP 0,676,418; EP 0 705 851; KR 20150058020; KR 101132180; Sheu, S., 2006, "Enhanced bimodal PE makes the impossible possible", http://www.tappi.org/content/06asiaplace/pdfs-english/enhanced.pdf; Chen et al., *Industrial & Engineering Chemical Research*, 2014, 53, pp. 19905-19915; US 2015/0322184; A. Calhoun, et al. "Polymer Chemistry", Chapter 5, pages 77-87.

Furthermore, forming a bimodal polyolefin composition in a mixed catalyst system would involve a first catalyst to catalyze the polymerization of, for example, ethylene under substantially similar conditions as that of a second catalyst while not interfering with the catalysis of polymerization of the second catalyst. For example, in a polymerization process, the degree of comonomer incorporation ability is often represented by the wt % of comonomer in the polymer backbone to achieve a certain polymer density. In a gas phase polymerization process, the degree of comonomer incorporation is influenced by the concentrations of comonomer and monomer in the gas phase. In a slurry phase polymerization process this would be influenced by the concentrations of comonomer and monomer in the liquid diluent phase. In a homogeneous solution phase polymerization process, this would be influenced by the concentrations of comonomer and monomer in the solution phase. For mixed catalyst systems having two metallocene catalysts, the catalysts may interfere with the polymerization catalysis of each other, resulting in reduced catalytic activity, reduced molecular weight polyolefins, and reduced comonomer incorporation.

Thus, there exists a need for catalyst systems that provide for polyolefin compositions having, for example, new combinations of comonomer content fractions, molecular weights, and densities. There is further a need for catalyst systems where a first catalyst does not negatively impact the polymerization catalysis of a second catalyst or vice versa in a mixed catalyst system. There is also a need for processes for the polymerization of olefins (such as ethylene) to provide polyolefins having unique combination of properties of two or more of high stiffness, high toughness, good optical properties, and good processability.

SUMMARY OF THE INVENTION

The present disclosure provides a catalyst system comprising the product of the combination of a Group 4 metallocene catalyst represented by formula (I):

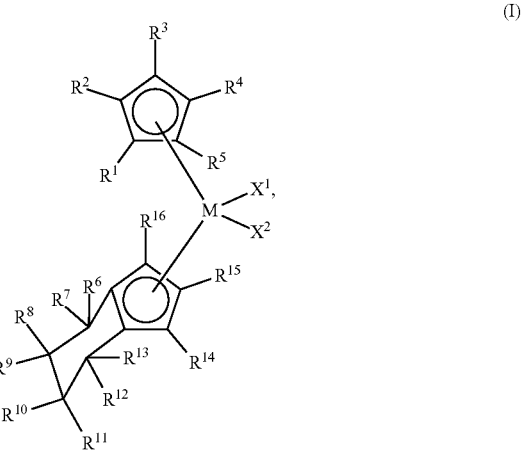

wherein:
M is a group 4 metal,
X$^1$ and X$^2$ are independently a univalent anionic ligand, a diene ligand, an alkylidene
ligand, or X$^1$ and X$^2$ are joined to form a metallocyclic ring,
each of R$^1$, R$^2$, R$^3$, R$^4$, R$^5$, R$^6$, R$^{13}$, R$^{14}$, R$^{15}$, and R$^{16}$ is independently selected from hydrogen, halogen, C$_1$-C$_{40}$ hydrocarbyl, substituted C$_1$-C$_{40}$ hydrocarbyl, —NR'$_2$, —SR', —OR', —OSiR'$_3$, or —PR'$_2$, wherein each R' is independently hydrogen, halogen, C$_1$-C$_{10}$ alkyl, or C$_6$-C$_{10}$ aryl, or one or more of R$^1$ and R$^2$, R$^2$ and R$^3$, R$^3$ and R$^4$, R$^4$ and R$^5$, R$^1$ and R$^5$, R$^{14}$ and R$^{15}$, and R$^{15}$ and R$^{16}$ are joined to form a saturated ring, unsaturated ring, substituted saturated ring, or substituted unsaturated ring, each of $R^7$, $R^8$, $R^9$, $R^{10}$, $R^{11}$, and $R^{12}$ is independently selected from hydrogen, halogen, $C_1$-$C_{40}$ hydrocarbyl, substituted $C_1$-$C_{40}$ hydrocarbyl, aryl, substituted aryl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^7$ and $R^8$, $R^8$ and $R^{10}$, and $R^{10}$ and $R^{12}$ are joined to form a saturated ring, unsaturated ring, substituted saturated ring, or substituted unsaturated ring; and an iron catalyst represented by formula (II):

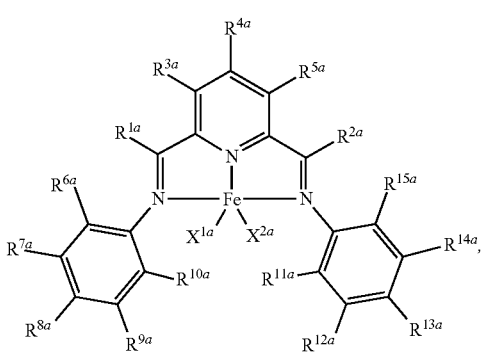

(II)

wherein:

$R^{6a}$ and $R^{15a}$ are independently halogen, —CF$_3$, hydrogen, or $C_1$-$C_{22}$-alkyl, or —OR', each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —NR'$_2$, —OR' or —SiR"$_3$, wherein $R^{1a}$ optionally bonds with $R^{3a}$, and $R^{2a}$ optionally bonds with $R^{5a}$, in each case to independently form a five-, six- or seven-membered ring, each of $R^{3a}$, $R^{4a}$, $R^{5a}$, $R^{7a}$, $R^{8a}$, $R^{9a}$, $R^{10a}$, $R^{11a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, —NR'$_2$, —OR', halogen, —SiR"$_3$ or five-, six- or seven-membered heterocyclyl comprising at least one atom selected from N, P, O and S;

wherein each of $R^{3a}$, $R^{4a}$, $R^{5a}$, $R^{7a}$, $R^{8a}$, $R^{9a}$, $R^{10a}$, $R^{11a}$, $R^{12a}$, $R^{13a}$, and $R^{14a}$ is independently optionally substituted by halogen, —NR'$_2$, —OR' or —SiR"$_3$, $X^{1a}$ and $X^{2a}$ are independently halogen, hydrogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'$_2$, —OR', —SR', —SO$_3$R', —OC(O)R', —CN, —SCN, β-diketonate, —CO, —BF$_4^-$, —PF$_6^-$ or bulky non-coordinating anion, or $X^{1a}$ and $X^{2a}$ optionally bond to form a five- or six-membered ring, each R' is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or —SiR"$_3$, wherein R' is optionally substituted by halogen or nitrogen- or oxygen-containing groups, or two R' radicals optionally bond to form a five- or six-membered ring, each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, wherein each R" is optionally substituted by halogen or nitrogen- or oxygen-containing groups, or two R" radicals optionally bond to form a five- or six-membered ring.

The present disclosure further provides a process for polymerization of monomers (such as olefin monomers) comprising contacting one or more monomers with the catalyst system described above.

The present disclosure further provides a process to produce ethylene polymer compositions comprising: i) contacting in a single reaction zone, in the gas phase and/or slurry phase, ethylene and $C_3$ to $C_{20}$ comonomer with a catalyst system comprising a support, an activator, and the catalyst system as described above, and ii) obtaining an ethylene polymer composition having at least 50 mol % ethylene and a density of 0.890 g/cc or more, alternatively 0.93 g/cc or more.

The present disclosure further provides a process to produce ethylene polymer compositions comprising: i) contacting in one or more reaction zones, in the gas phase and/or slurry phase, ethylene and $C_3$ to $C_{20}$ comonomer with a catalyst system comprising a support, an activator, and the catalyst system described above, and obtaining an ethylene polymer having: a) a melt index of 0.2 to 10 g/10 min or greater, a density of 0.92 g/cm$^3$ or greater, a melt index ratio of 90 or greater, and a comonomer content (hexene) of 7 wt % or greater; or b) a melt index of 0.2 to 10 g/10 min or less, a density of 0.92 g/cm$^3$ or greater, a melt index ratio of 50 or less, and a comonomer content (hexene) of 7 wt % or greater.

DETAILED DESCRIPTION OF THE INVENTION

Figure 1:
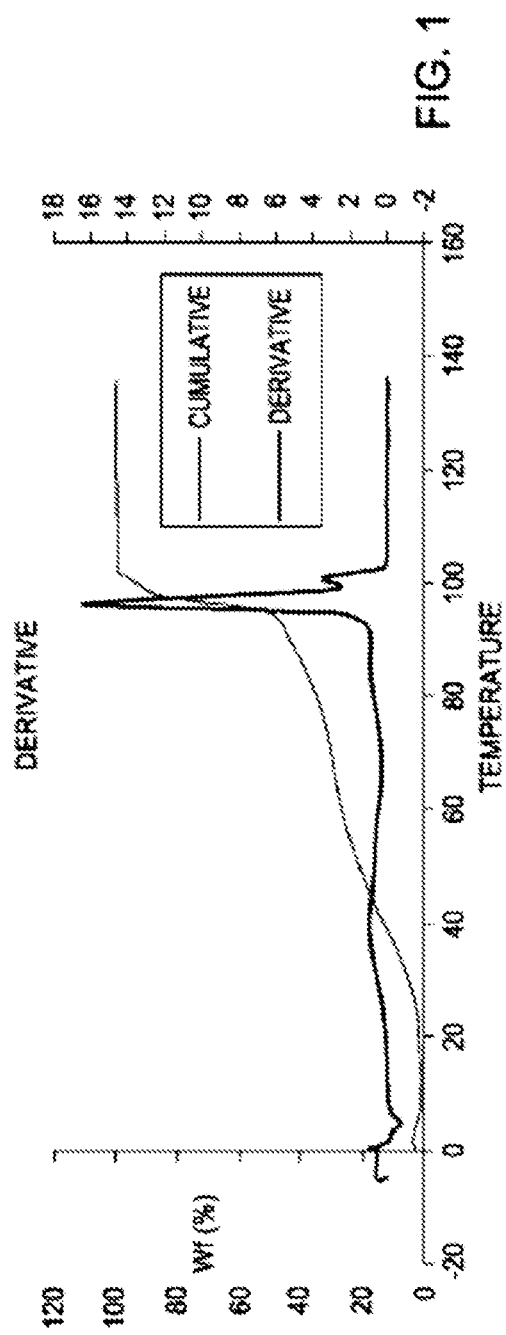
FIG. 1 is a graph illustrating a temperature rising elution fractionation curve of a mixed catalyst system under polymerization conditions, according to one embodiment.

The present disclosure provides for catalyst systems and processes for use thereof. Catalyst systems include an unbridged Group 4 indenyl metallocene catalysts and a 2,6-bis(imino)pyridyl iron complex. Catalyst systems of the present disclosure can be used for olefin polymerization processes and can provide enhanced polymer properties. For example, catalyst systems and processes of the present disclosure can provide ethylene polymers having the unique properties of one or more of high stiffness, high toughness, good optical properties, and good processability.

In a class of embodiments, catalyst systems of the present disclosure can be sensitive to the amount of comonomer present during polymerization, e.g., a comonomer response during a polymerization process. For example, hexene can be used in olefin polymerization to control the physical properties of the polyolefin. Owing to the comonomer response of the catalyst components in the catalyst systems, some properties, such as melt index ratio, of a resulting polymer are controllable. Changes of comonomer concentration in reactor may affect melt index ratio, and other properties of the resulting polyolefin when using a combination of such two catalyst components. Thus, the present disclosure further provides a multi-modal polyolefin composition obtained from polymerizations using catalyst systems of the present disclosure.

In at least one embodiment, the catalyst represented by formula (I) is a poor comonomer (such as hexene) incorporator and yields polyethylene with lower molecular weight than the catalyst represented by formula (II) which under similar conditions yields higher molecular weight with higher comonomer content than the catalyst represented by formula (I). When the catalyst represented by formula (I) and the catalyst represented by formula (II) are combined on one support, an in-reactor blend of polyethylene is produced with a mix of low and high density resins in which the higher density resin (higher melting) is combined with lower density higher molecular weight resin.

The present disclosure further provides for a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalyst system described above, and obtaining an ethylene polymer having: a) a melt index of 0.2 to 10 g/10 min, such as 1.5 g/10 min or greater, a density of 0.92 g/cm$^3$ or greater, a melt index ratio of 90 or greater, and a comonomer content (hexene) of 7 wt % or greater; or b) a melt index of 0.2 to 10 g/10 min, such as 1.5 g/10 min or less, a density of 0.92 g/cm$^3$ or greater, a melt index ratio of 50 or less, and a comonomer content (hexene) of 7 wt % or greater.

For purposes of the present disclosure, a "catalyst system" is a combination of at least two catalyst compounds, an optional activator, and an optional support material. The catalyst systems may further comprise one or more additional catalyst compounds. The terms "mixed catalyst system", "dual catalyst system", "mixed catalyst", and "supported catalyst system" may be used interchangeably herein with "catalyst system." For the purposes of the present disclosure, when catalyst systems are described as comprising neutral stable forms of the components, it is well understood by one of ordinary skill in the art, that the ionic form of the component is the form that reacts with the monomers to produce polymers.

As used herein, the term "metallocene compound" includes compounds having two or three Cp ligands (cyclopentadienyl and ligands isolobal to cyclopentadienyl, such as indenyl or hydrogenated indenyl) bound to at least one Zr or Hf metal atom, and one or more leaving group(s) bound to the at least one metal atom.

For purposes of the present disclosure in relation to all catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor," "pre-catalyst," "catalyst," "catalyst compound," "metal compound," "metal catalyst compound", "transition metal compound," or "transition metal complex." These words are used interchangeably. "Activator" and "cocatalyst" are also used interchangeably.

The terms "hydrocarbyl radical," "hydrocarbyl", "alkyl", and "hydrocarbyl group" are used interchangeably throughout this document. Likewise the terms "group," "radical," and "substituent" are also used interchangeably in this document. For purposes of the present disclosure, "hydrocarbyl radical" is defined to be $C_1$-$C_{100}$ radicals, that may be linear, branched, or cyclic, and when cyclic, aromatic or non-aromatic.

For purposes of the present disclosure, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as Cl, Br, F, I, NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like (where R* is H or a $C_1$ to $C_2$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably, N, O, or S.

The term "arylalky" is an aryl-substituted alkyl radical and may be used interchangeably with the term "aralkyl". Examples of aralkyl include benzyl, diphenylmethyl, triphenylmethyl, phenylethyl and diphenylethyl.

The term "alkenyl" means a straight-chain, branched-chain, or cyclic hydrocarbon radical having one or more carbon-carbon double bonds. These alkenyl radicals may be substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl and the like including their substituted analogues.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

In the description herein, a catalyst may be described as a catalyst precursor, a pre-catalyst compound, metallocene catalyst compound or a transition metal compound, and these terms are used interchangeably. A polymerization catalyst system is a catalyst system that can polymerize monomers into polymer. An "anionic ligand" is a negatively charged ligand which donates one or more pairs of electrons to a metal ion. A "neutral donor ligand" is a neutrally charged ligand which donates one or more pairs of electrons to a metal ion.

The term "continuous" means a system that operates without interruption or cessation for a period of time, preferably where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, *Ind. Eng. Chem. Res.*, 2000, 29, 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

As used herein, the numbering scheme for the Periodic Table groups is the new notation as set out in Chemical and Engineering News, 63(5), 27, (1985), unless otherwise specified.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole (or mmol) of catalyst (cat) used (kgP/molcat or gP/mmolCat), and catalyst activity can also be expressed per unit of time, for example, per hour (hr).

An "olefin," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

"Linear" polyethylene means that the polyethylene has no long chain branches, typically referred to as a branching index ($g'_{vis}$) of 0.97 or above, preferably 0.98 or above. Branching index, $g'_{vis}$, is measured by GPC-4D as described below.

For purposes of the present disclosure, ethylene shall be considered an alpha-olefin (α-olefin).

As used herein, $M_n$ is number average molecular weight, $M_w$ is weight average molecular weight, and Mz is z average molecular weight, wt % is weight percent, and mol % is mole percent. Unless otherwise noted, all average molecular weights (e.g., Mw, Mn, Mz) are reported in units of g/mol. Molecular weight distribution (MWD), also referred to as polydispersity index (PDI), is defined to be Mw divided by Mn.

The following abbreviations may be used herein: Me is methyl, Et is ethyl, t-Bu and $^t$Bu are tertiary butyl, iPr and $^i$Pr are isopropyl, Cy is cyclohexyl, THF (also referred to as thf) is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylalumoxane.

For purposes of the present disclosure, one catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of the present disclosure, e.g., rac-bis(1-methylindenyl)hafnium dimethyl is considered to be the same as meso-bis(1-methyl-indenyl)hafnium dimethyl. Thus, as used herein, a single catalyst component having a racemic and/or meso isomer does not, itself, constitute two different catalyst components.

Metallocene Catalysts

In aspects of the present disclosure, the catalyst systems comprise a Group 4 metallocene catalyst represented by formula (I):

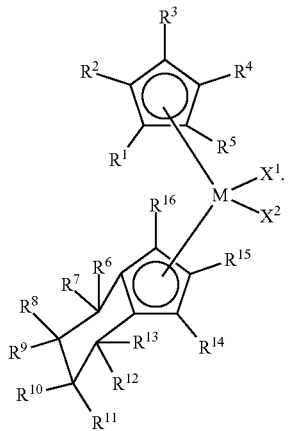

M is a group 4 metal such as hafnium (Hf) or zirconium (Zr) in at least one embodiment, M is hafnium.

$X^1$ and $X^2$ are independently a univalent anionic ligand, a diene ligand, an alkylidene ligand, or $X^1$ and $X^2$ are joined to form a metallocyclic ring. $X^1$ and $X^2$ can be independently a halide, a hydride, an alkyl group, an alkenyl group or an arylalkyl group. In at least one embodiment, $X^1$ and $X^2$ are independently selected from hydrocarbyl radicals having from 1 to 20 carbon atoms, aryls, hydrides, amides, alkoxides, sulfides, phosphides, halides, dienes, amines, phosphines, ethers, and a combination thereof, ($X^1$ and $X^2$ may form a part of a fused ring or a ring system), preferably X and $X^2$ are independently selected from halides, aryls and $C_1$ to $C_5$ alkyl groups, preferably $X^1$ and $X^2$ is independently a phenyl, methyl, ethyl, propyl, butyl, pentyl, or chloride group. In at least one embodiment, $X^1$ and $X^2$ are chloride.

Each of $R^1$, $R^2$, $R^3$, $R^4$, $R^5$, $R^6$, $R^{13}$, $R^{14}$, $R^{15}$, and $R^{16}$ is independently selected from hydrogen, halogen, $C_1$-$C_{40}$ hydrocarbyl, substituted $C_1$-$C_{40}$ hydrocarbyl, $-NR'_2$, $-SR'$, $-OR'$, $-OSiR'_3$, or $-PR'_2$, wherein each R' is independently hydrogen, halogen, $C_1$-$C_{10}$ alkyl, or $C_6$-$C_{10}$ aryl, or one or more of $R^1$ and $R^2$, $R^2$ and $R^3$, $R^3$ and $R^4$, $R^4$ and $R^5$, $R^1$ and $R^5$, $R^{14}$ and $R^{15}$, and $R^{15}$ and $R^{16}$ are joined to form a saturated ring, unsaturated ring, substituted saturated ring, or substituted unsaturated ring. In at least one embodiment, each of $R^6$ and $R^{13}$ is hydrogen. In at least one embodiment, one or more of $R^1$, $R^2$, $R^3$, $R^4$, and $R^5$ is $-CH_2-Si-(CH_3)_3$. In at least one embodiment, $R^1$, $R^2$, $R^3$, and $R^4$ are each hydrogen and $R^5$ is $-CH_2-Si-(CH_3)_3$. In at least one embodiment, each of $R^{14}$, $R^{15}$, and $R^{16}$ is hydrogen.

Each of $R^7$, $R^8$, $R^9$, $R^{10}$, $R^{11}$, and $R^{12}$ is independently selected from hydrogen, halogen, $C_1$-$C_{40}$ hydrocarbyl, substituted $C_1$-$C_{40}$ hydrocarbyl, aryl, substituted aryl, $-NR'_2$, $-SR'$, $-OR'$, $-OSiR'_3$, or $-PR'_2$, wherein each R' is independently hydrogen, halogen, $C_1$-$C_{10}$ alkyl, or $C_6$-$C_{10}$ aryl, or one or more of $R^7$ and $R^8$, $R^8$ and $R^{10}$, and $R^{10}$ and $R^{12}$ are joined to form a saturated ring, unsaturated ring, substituted saturated ring, or substituted unsaturated ring. In at least one embodiment, each of $R^6$, $R^7$, $R^8$, $R^9$, $R^{10}$, $R^{11}$, $R^{12}$, and $R^{13}$ is hydrogen.

In at least one embodiment, each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently is independently hydrogen, halide, alkoxide or $C_1$ to $C_4$ substituted or unsubstituted hydrocarbyl (such as $C_1$ to $C_{12}$ substituted or unsubstituted hydrocarbyl), or $-R''-SiR'_3$ or $-R''-CR'_3$ where R'' is $C_1$ to $C_4$ hydrocarbyl (such as $-CH_2-$; $-CH_2CH_2-$; -(Me)CHCH$_2-$; or -(Me)CH$-$), and each R' is independently $C_1$ to $C_{20}$ substituted or unsubstituted hydrocarbyl and at least one R' is $C_1$ to $C_{20}$ substituted or unsubstituted hydrocarbyl. In at least one embodiment, each R' is independently selected from methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 R' are not H, alternatively 3 R' are not H.

In at least one embodiment, $C_1$-$C_4$ hydrocarbyl, $C_{1-20}$ hydrocarbyl, or $C_1$-$C_{12}$ hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

In at least one embodiment, each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, $-CH_2-SiMe_3$, $-CH_2-SiEt_3$, $-CH_2-SiPr_3$, $-CH_2-SiBu_3$, $-CH_2-SiCy_3$, $-CH_2-C(CH_3)_3$, $-CH_2-CH(CH_3)_2$, $-CH_2CPh_3$, $-CH_2(C_6Me_5)$, $-CH_2-C(CH_3)_2Ph$, $-CH_2-C(Cy)Ph_2$, $-CH_2SiPh_3$, $-CH_2-Si(CH_3)_2Ph$, $-CH_2-Si(CH_3)_2Ph$, $-CH_2-Si(CH_3)Ph_2$, $-CH_2-Si(Et)_2Ph$, $-CH_2-Si(Et)Ph_2$, $-CH_2-Si(Cy)Ph_2$, or $-CH_2-Si(Cy)_2Ph$.

In at least one embodiment, each of $R^6$, $R^7$, $R^8$, $R^9$, $R^{10}$, $R^{11}$, $R^{12}$, and $R^{13}$ is hydrogen and each of $R^1$, $R^2$, $R^3$, $R^4$, $R^5$, $R^{14}$, $R^{15}$, and $R^{16}$ is independently hydrogen, $-CH_2-SiMe_3$, $-CH_2-SiEt_3$, $-CH_2-SiPr_3$, $-CH_2-SiBu_3$, $-CH_2-SiCy_3$, $-CH_2-C(CH_3)_3$, $-CH_2-CH(CH_3)_2$, $-CH_2CPh_3$, $-CH_2(C_6Me_5)$, $-CH_2-C(CH_3)_2Ph$, $-CH_2-C(Cy)Ph_2$, $-CH_2SiPh_3$, $-CH_2-Si(CH_3)_2Ph$, $-CH_2-Si(CH_3)_2Ph$, $-CH_2-Si(CH_3)Ph_2$, $-CH_2-Si(Et)_2Ph$, $-CH_2-Si(Et)Ph_2$, $-CH_2-Si(Cy)Ph_2$, or $-CH_2-Si(Cy)_2Ph$.

In at least one embodiment, each of $R^6$, $R^7$, R, $R^9$, $R^{10}$, $R^{11}$, $R^{12}$, $R^{13}$, $R^{14}$, $R^{15}$, and $R^{16}$ is hydrogen and each of $R^1$, $R^2$, $R^3$, $R^4$, and $R^5$ is independently hydrogen, $-CH_2-SiMe_3$, $-CH_2-SiEt_3$, $-CH_2-SiPr_3$, $-CH_2-SiBu_3$, $-CH_2-SiCy_3$, $-CH_2-C(CH_3)_3$, $-CH_2-CH(CH_3)_2$, $-CH_2CPh_3$, $-CH_2(C_6Me_5)$, $-CH_2-C(CH_3)_2Ph$, $-CH_2-C(Cy)Ph_2$, $-CH_2SiPh_3$, $-CH_2-Si(CH_3)_2Ph$, $-CH_2-Si(CH_3)_2Ph$, $-CH_2-Si(CH_3)Ph_2$, $-CH_2-Si(Et)_2Ph$, $-CH_2-Si(Et)Ph_2$, $-CH_2-Si(Cy)Ph_2$, or $-CH_2-Si(Cy)_2Ph$.

A catalyst represented by formula (I) can bean asymmetric catalyst. Useful asymmetric catalysts are preferably such that a mirror plane cannot be drawn through the metal center and the cyclopentadienyl moieties bridged to the metal center are structurally different.

In at least one embodiment, the Group 4 metallocene catalyst represented by formula (I) is one or more of:
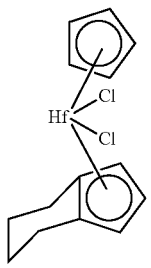
1
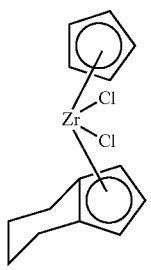
2
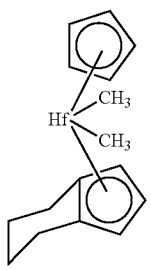
3
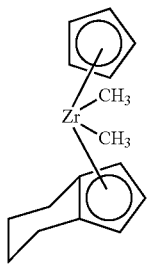
4
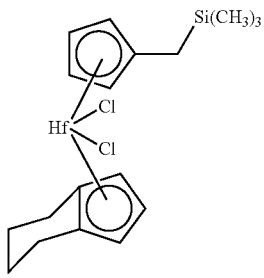
5
-continued
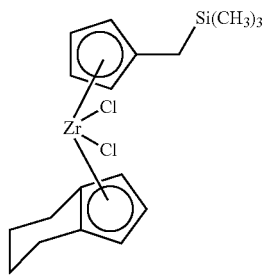
6
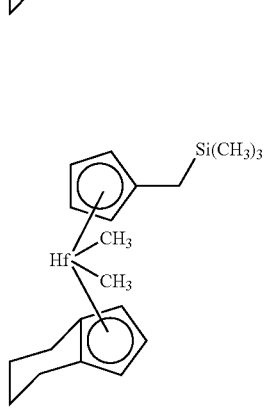
7
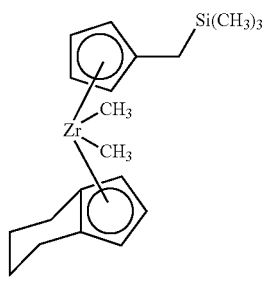
8
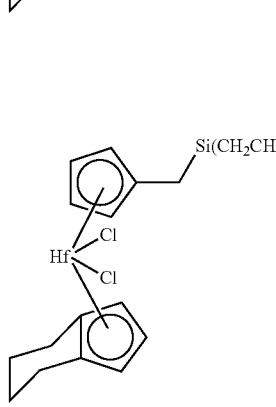
9
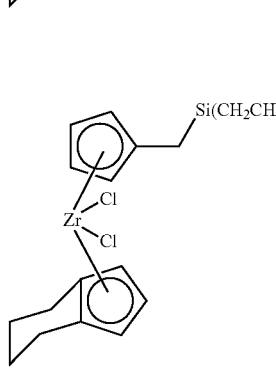
10

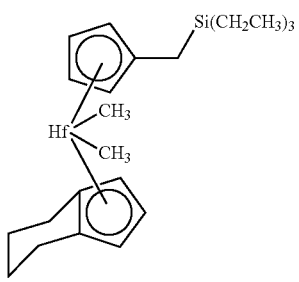
11
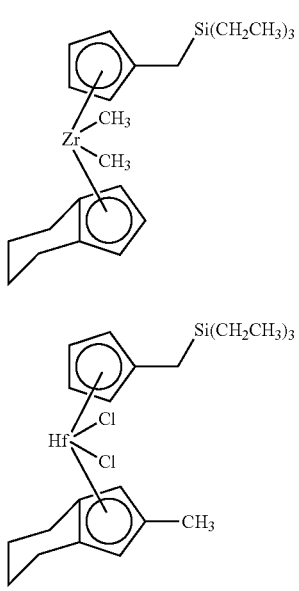
12
13
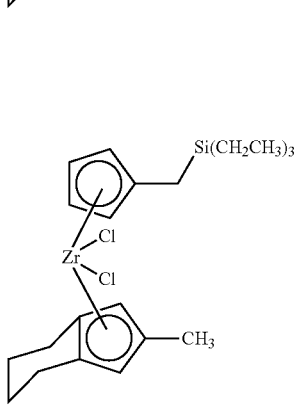
14
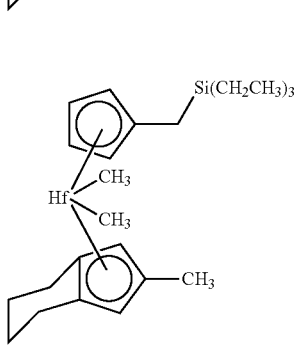
15
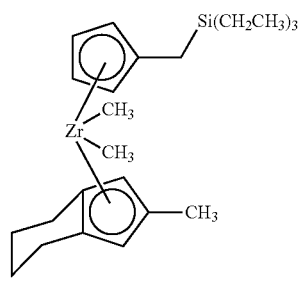
16
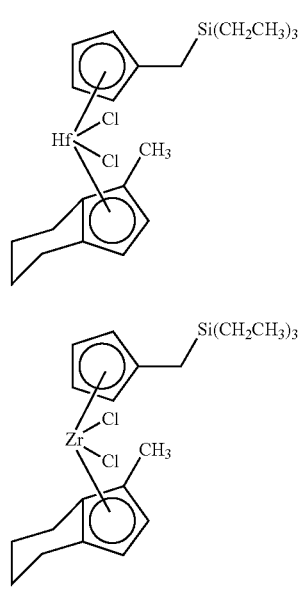
17
18
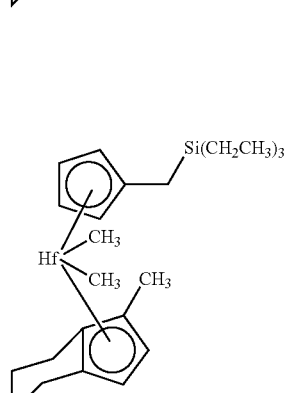
19
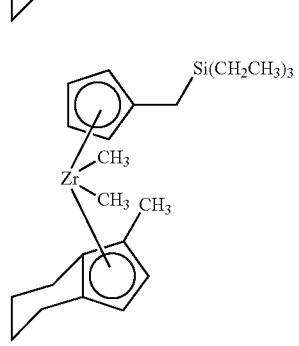
20

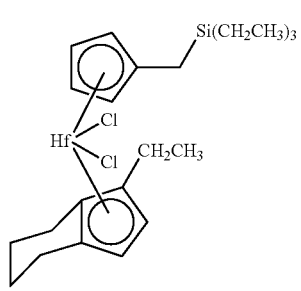
21
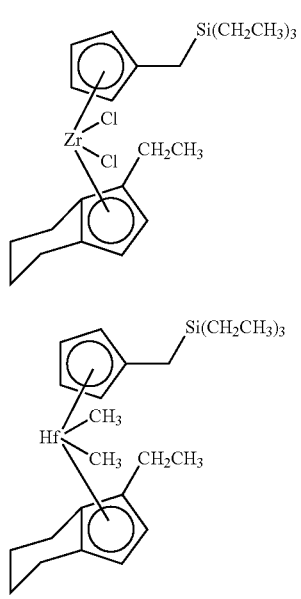
22
23
24
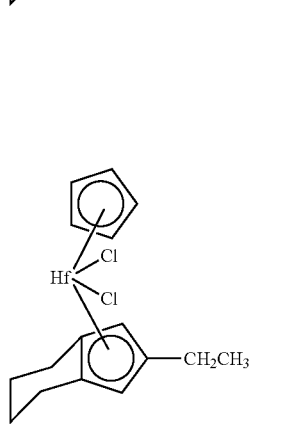
25
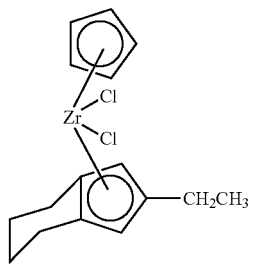
26
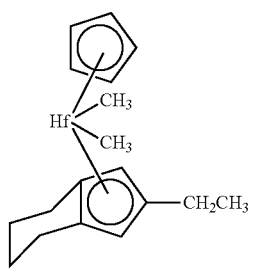
27
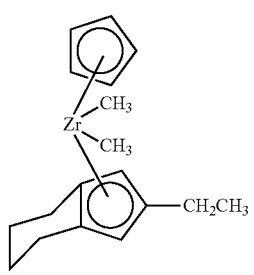
28
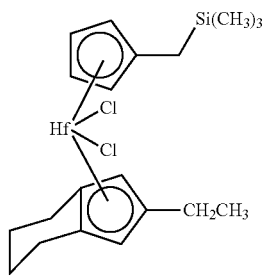
29
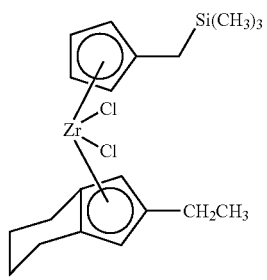
30

31
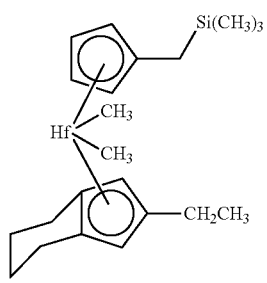
32
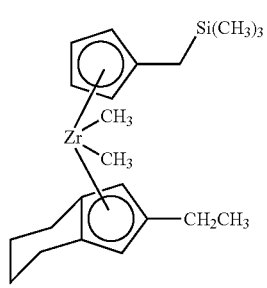
33
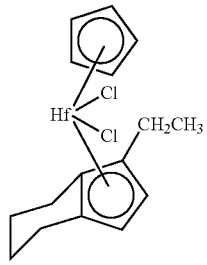
34
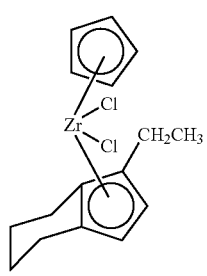
35
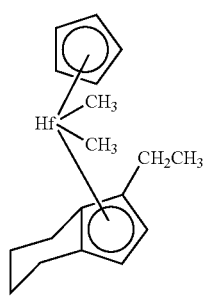
36
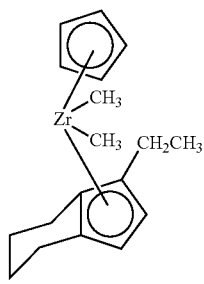
37
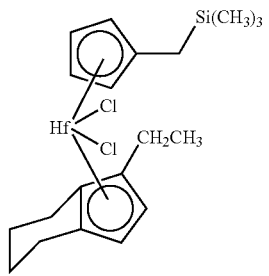
38
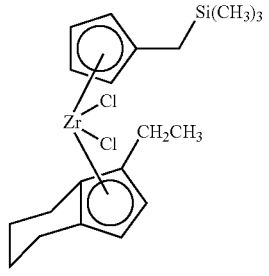
39
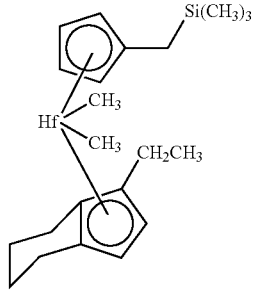
40
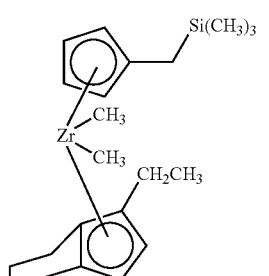

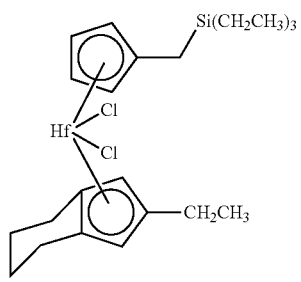
41
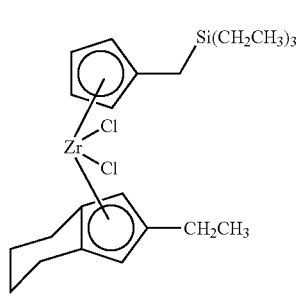
42
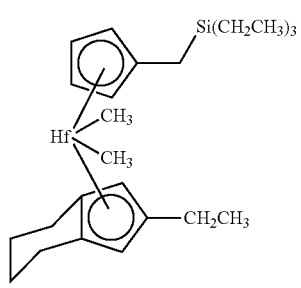
43
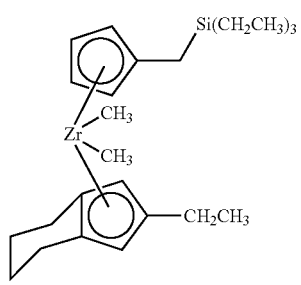
44
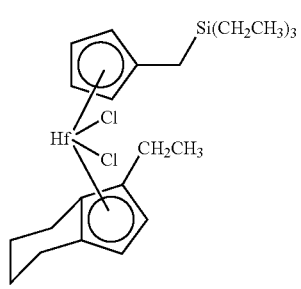
45
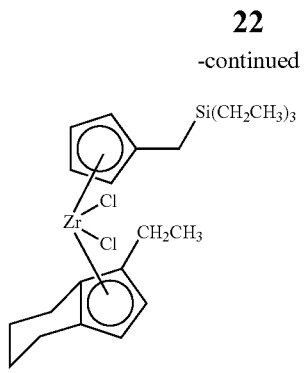
46
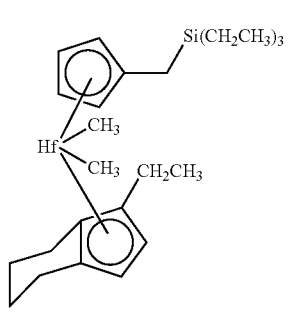
47
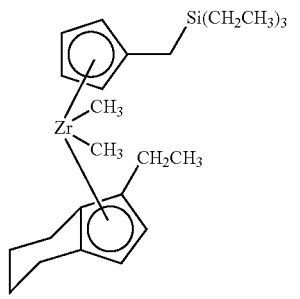
48
In at least one embodiment, the Group 4 metallocene catalyst represented by formula (I) is one or more of:
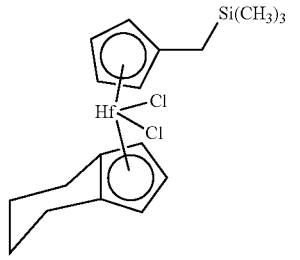
5
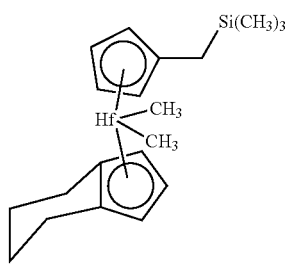
7

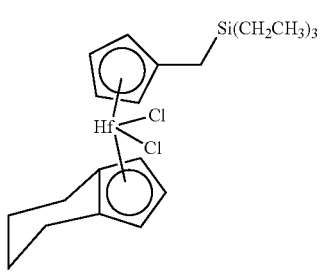

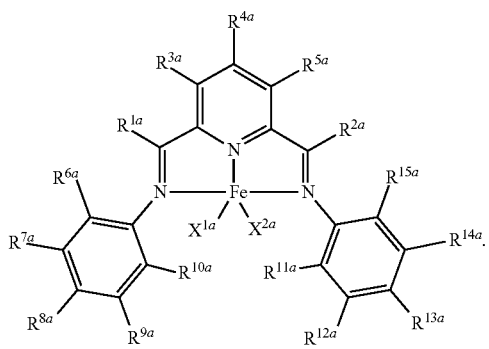

Iron Catalysts

The second catalyst may be an iron complex represented by formula (II):

(II)

$R^{6a}$ and $R^{15a}$ are independently halogen, —$CF_3$, hydrogen, or $C_1$-$C_{22}$-alkyl, or —OR'. In at least one embodiment, $R^{6a}$ and $R^{15a}$ are independently fluorine, chlorine, bromine, or iodine. In at least one embodiment, $R^{6a}$ and $R^{15a}$ are chlorine.

Each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —$NR'_2$, —OR' or —$SiR''_3$, wherein $R^{1a}$ optionally bonds with $R^{3a}$, and $R^{2a}$ optionally bonds with $R^{5a}$, in each case to independently form a five-, six- or seven-membered ring. In at least one embodiment, $R^{1a}$ and $R^{2a}$ are independently $C_1$-$C_{22}$-alkyl, substituted $C_1$-$C_{22}$-alkyl, unsubstituted phenyl, or substituted phenyl. In at least one embodiment, each of $R^{1a}$ and $R^{2a}$ is independently selected from methyl, ethyl, n-propyl, isopropyl, n-butyl, isobutyl, sec-butyl, tert-butyl, n-pentyl, isopentyl, sec-pentyl, tert-pentyl, n-hexyl, isohexyl, sec-hexyl, tert-hexyl, n-heptyl, isoheptyl, sec-heptyl, tert-heptyl, n-octyl, isooctyl, sec-octyl, tert-octyl, n-nonyl, isononyl, sec-nonyl, tert-nonyl, n-decyl, isodecyl, sec-decyl, and tert-decyl.

Each of $R^{3a}$, $R^{4a}$, $R^{5a}$, $R^{7a}$, $R^{8a}$, $R^{9a}$, $R^{10a}$, $R^{11a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, —$NR'_2$, —OR', halogen, —$SiR''_3$ or five-, six- or seven-membered heterocyclyl comprising at least one atom selected from N, P, O and S. Each of $R^{3a}$, $R^{4a}$, $R^{5a}$, $R^{7a}$, $R^{8a}$, $R^{9a}$, $R^{10a}$, $R^{11a}$, $R^{12a}$, $R^{13a}$, and $R^{14a}$ is independently optionally substituted by halogen, —$NR'_2$, —OR' or —$SiR''_3$. In at least one embodiment, each of $R^{8a}$, $R^{10a}$, $R^{11a}$, and $R^{13a}$ is independently selected from $C_1$-$C_{22}$-alkyl, wherein each of $R^{8a}$, $R^{10a}$, $R^{11a}$, and $R^{13a}$ is independently optionally substituted by halogen, —$NR'_2$, —OR' or —$SiR''_3$. In at least one embodiment, $R^{7a}$, $R^{9a}$, $R^{12a}$, and $R^{14a}$ is hydrogen. In at least one embodiment, each of $R^{3a}$, $R^{4a}$, and $R^{5a}$ is hydrogen.

$X^{1a}$ and $X^{2a}$ are independently halogen, hydrogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —$NR'_2$, —OR', —SR', —$SO_3R'$, —OC(O)R', —CN, —SCN, β-diketonate, —CO, —$BF_4^-$, —$PF_6^-$ or bulky non-coordinating anion, or $X^{1a}$ and $X^{2a}$ optionally bond to form a five- or six-membered ring. Each R' is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or —$SiR''_3$, wherein R' is optionally substituted by halogen or nitrogen- or oxygen-containing groups, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, wherein each R" is optionally substituted by halogen or nitrogen- or oxygen-containing groups, or two R" radicals optionally bond to form a five- or six-membered ring. In at least one embodiment, $X^{1a}$ and $X^{2a}$ are chlorine.

In at least one embodiment, each of $R^{6a}$ and $R^{15a}$ is chlorine; each of $R^{1a}$ and $R^{2a}$ is $C_1$-$C_{20}$ hydrocarbyl; each of $R^{3a}$, $R^{4a}$, and $R^{5a}$ is hydrogen; each of $R^{8a}$, $R^{10a}$, $R^{11a}$ and $R^{13a}$ is $C_1$-$C_{20}$ hydrocarbyl; each of $R^{7a}$, $R^{9a}$, $R^{12a}$ and $R^{14a}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, —$NR'_2$, —OR', halogen, —$SiR''_3$ or five-, six- or seven-membered heterocyclyl comprising at least one atom selected from the group consisting of N, P, O and S; $R^{1a}$, $R^{2a}$, $R^{3a}$, $R^{4a}$, $R^{5a}$, $R^{7a}$, $R^{8a}$, $R^{9a}$, $R^{10a}$, $R^{11a}$, $R^{12a}$, and $R^{13a}$ are optionally substituted by halogen, —$NR'_2$, —OR' or —$SiR''_3$; each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR''_3$, wherein R' is optionally substituted by halogen, or two R' radicals optionally bond to form a five- or six-membered ring; each R" is independently hydrogen, $C_1$-$C_{22}$-alkyl, $C_2$-$C_{22}$-alkenyl, $C_6$-$C_{22}$-aryl or arylalkyl where alkyl has from 1 to 10 carbon atoms and aryl has from 6 to 20 carbon atoms, or two R" radicals optionally bond to form a five- or six-membered ring.

In at least one embodiment, an iron catalyst represented by formula (II) is one or more of:
1
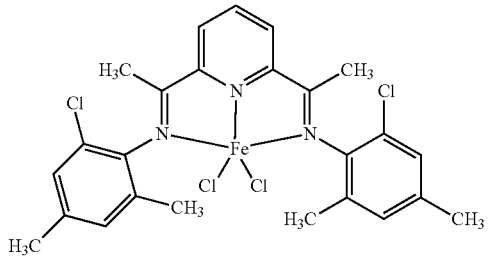
2
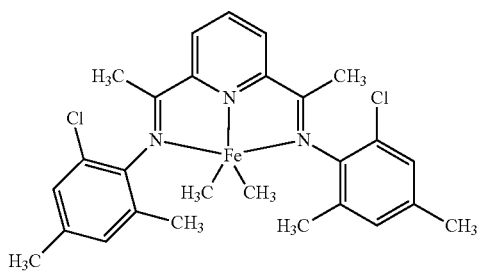
3
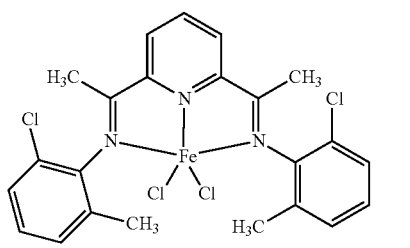
4
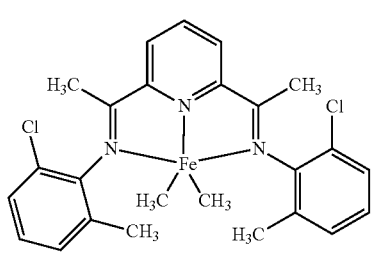
5
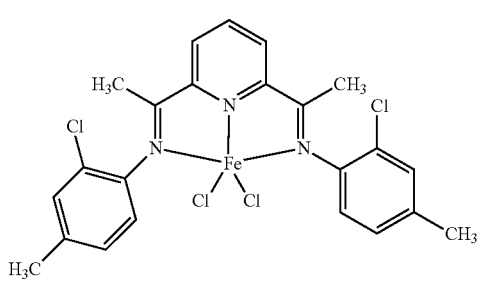
-continued
6
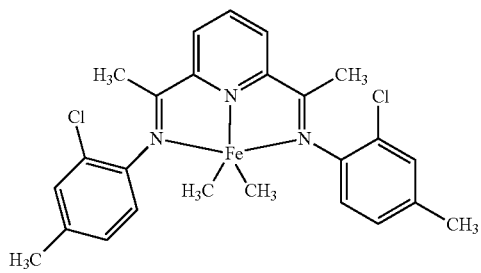
7
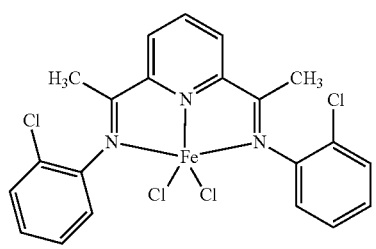
8
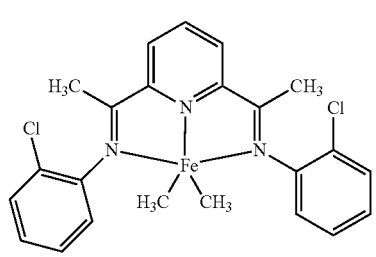
9
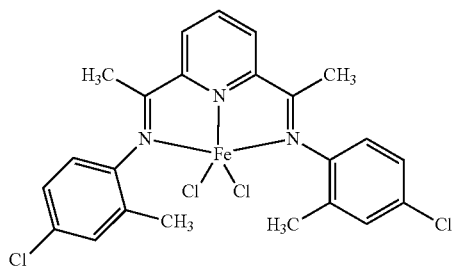
10
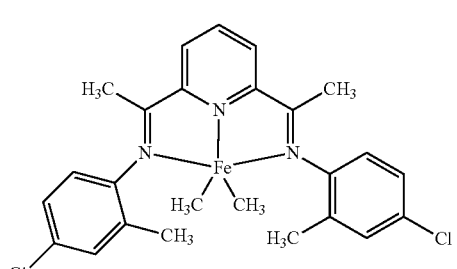
11
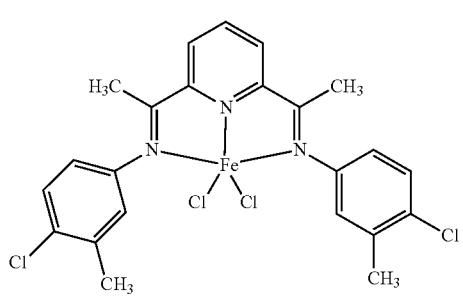

12
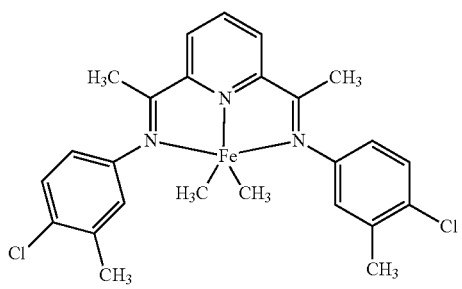
13
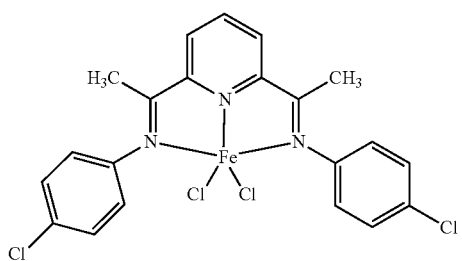
14
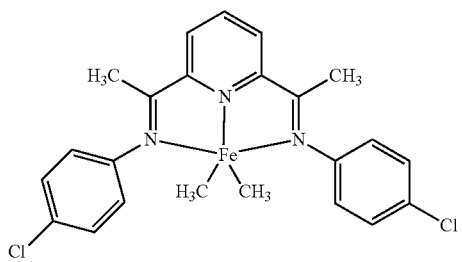
15
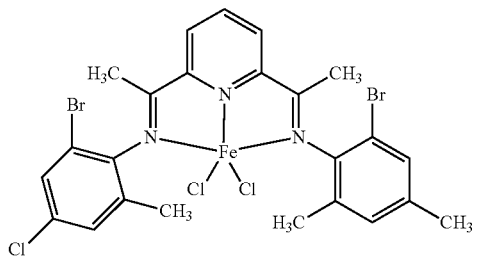
16
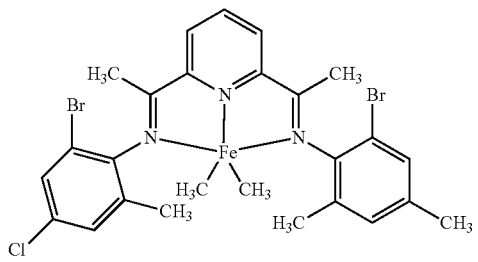
17
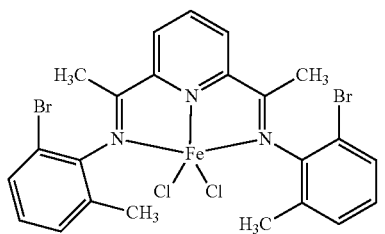
18
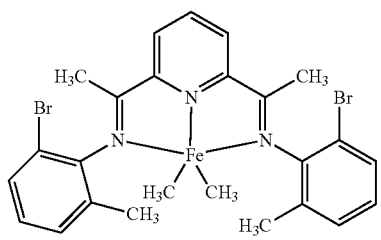
19
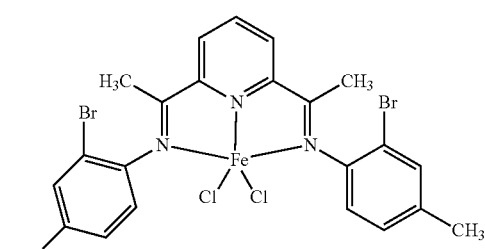
20
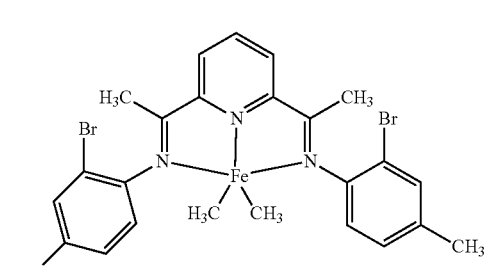
21
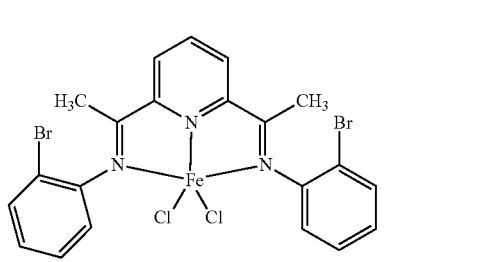
22
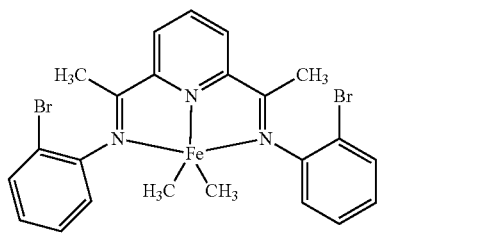
23
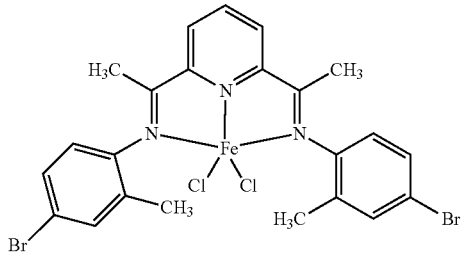

24
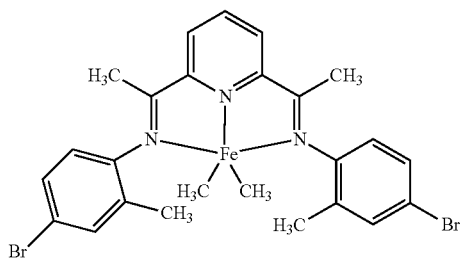
25
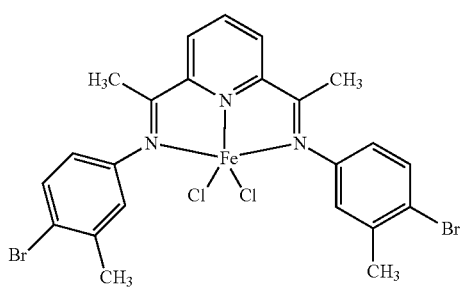
26
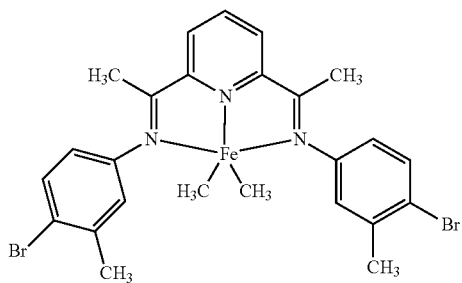
27
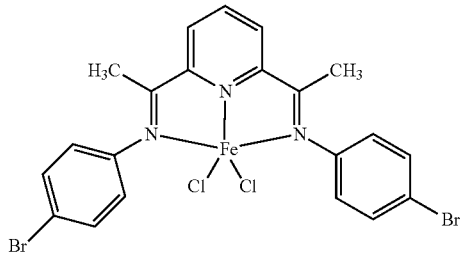
28
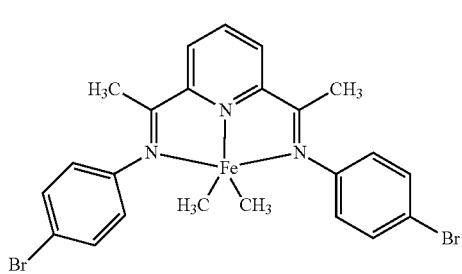
29
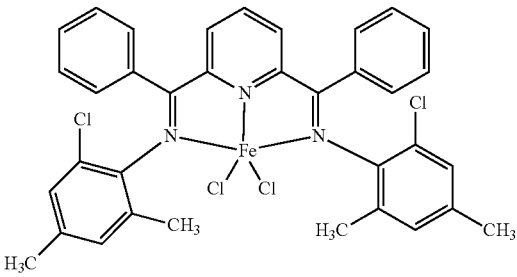
30
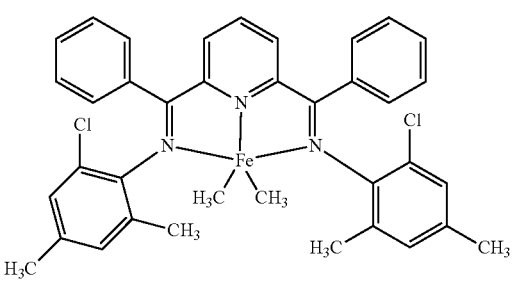
31
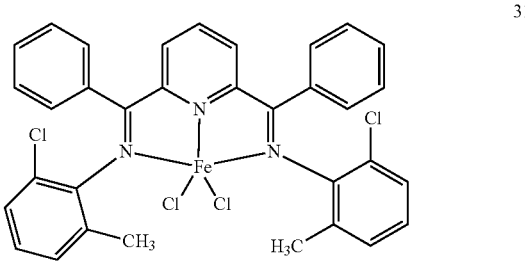
32
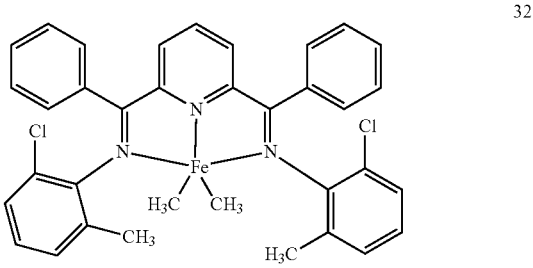
33
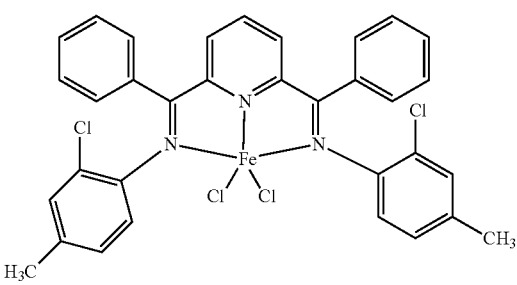

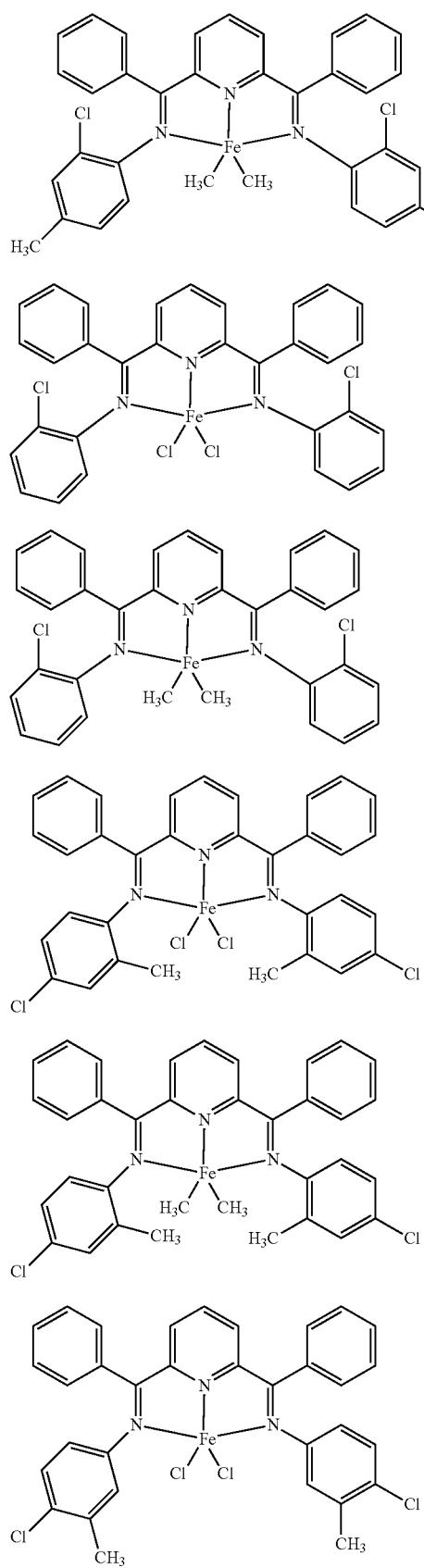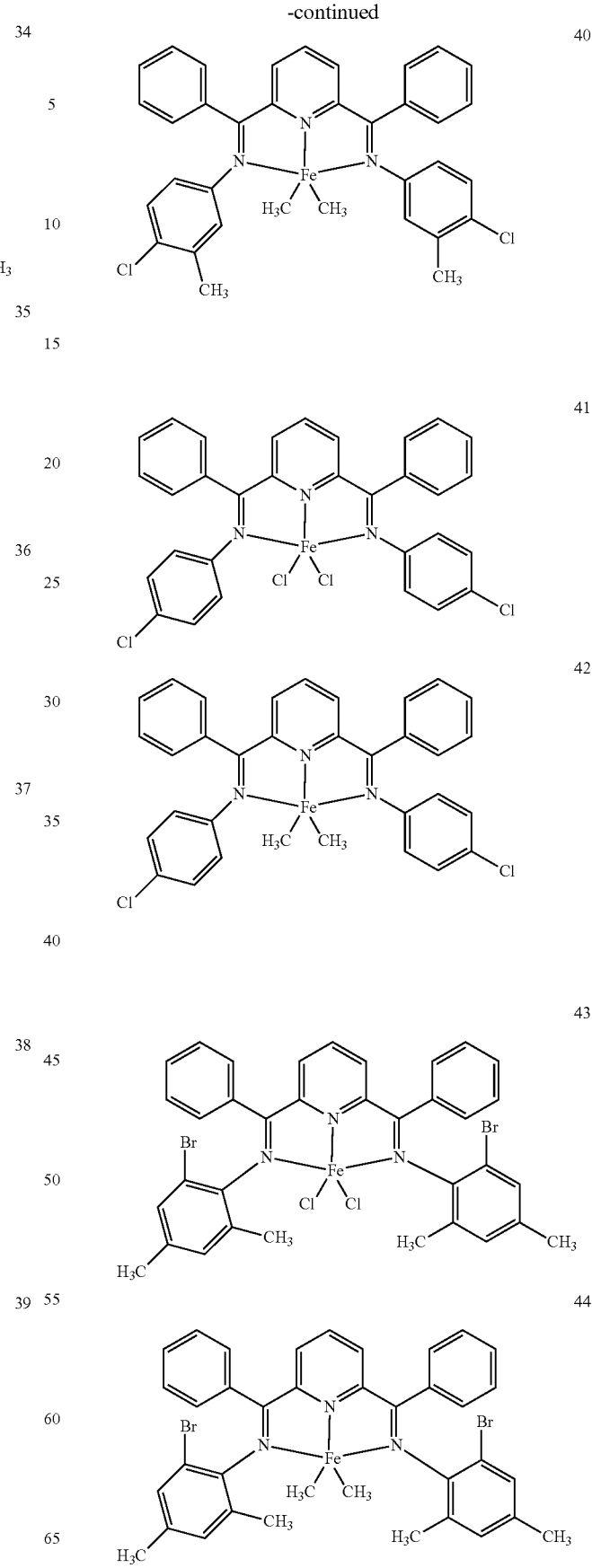

45
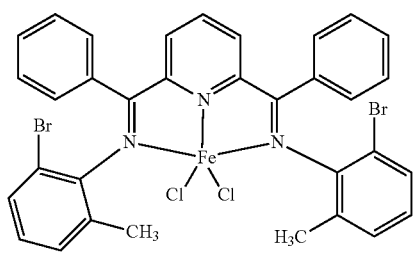
46
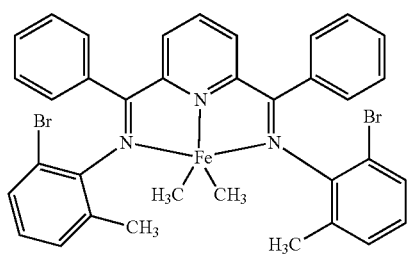
47
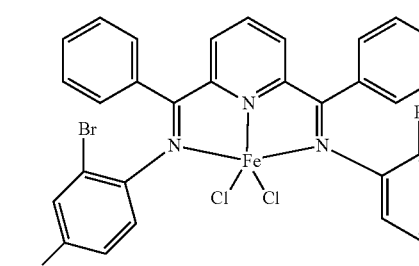
48
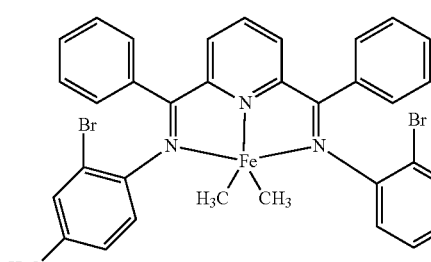
49
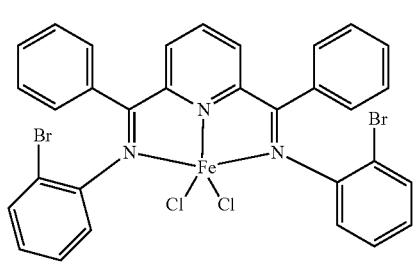
50
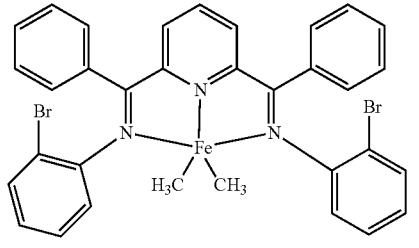
51
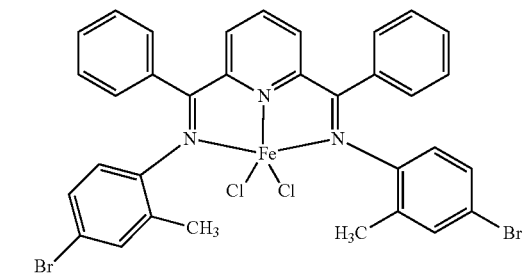
52
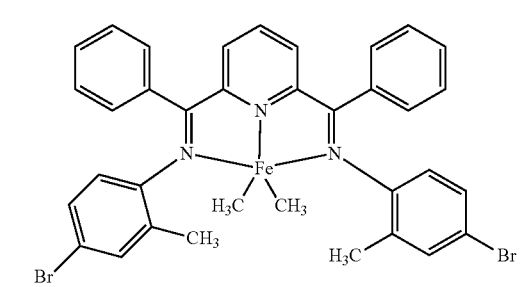
53
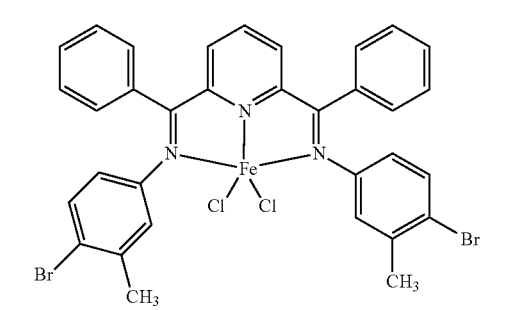
54
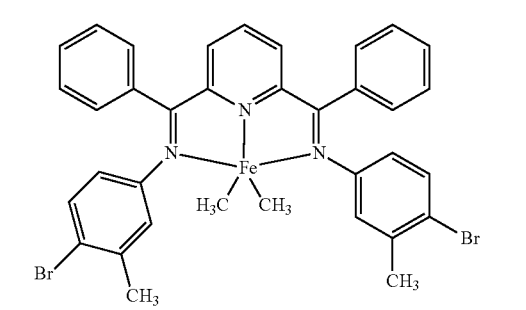
55
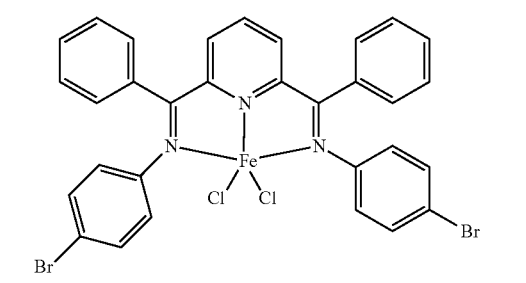

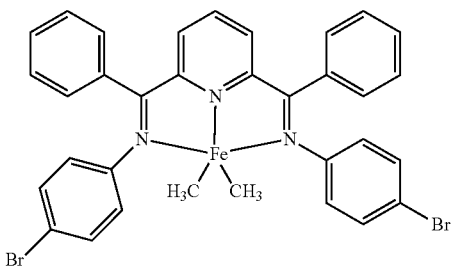

In at least one embodiment, an iron catalyst represented by formula (II) is one or more of:

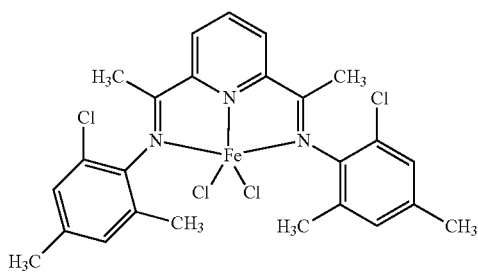

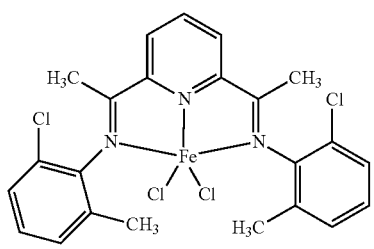

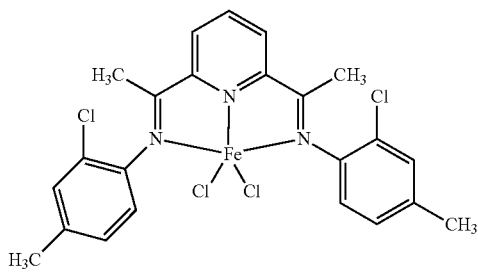

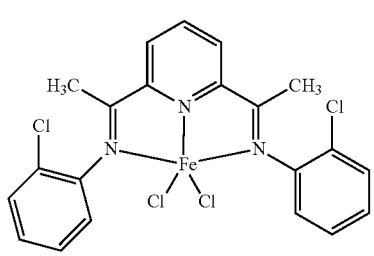

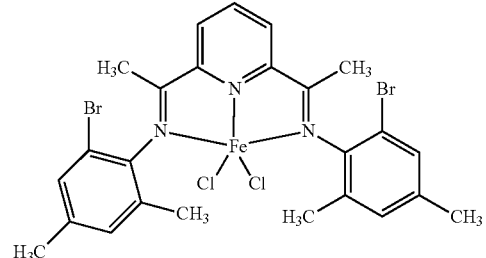

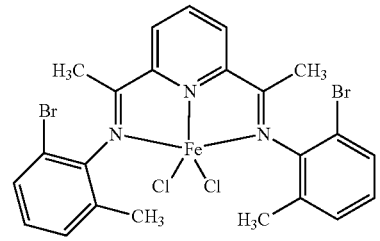

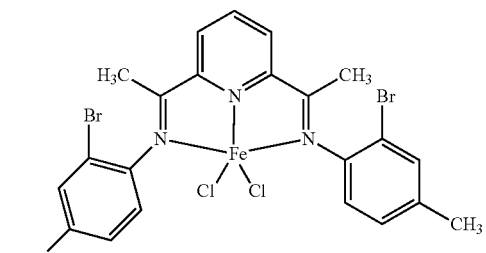

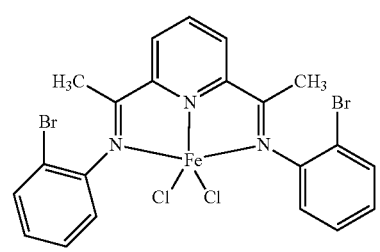

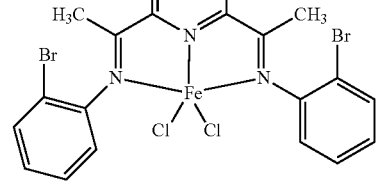

Support Material

In embodiments of the present disclosure, the catalyst systems comprise the product of the combination of one or more support materials. Preferably, a support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, a support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like.

Preferred support materials include $Al_2O_3$, $ZrO_2$, $SiO_2$, and combinations thereof, more preferably, $SiO_2$, $Al_2O_3$, or $SiO_2/Al_2O_3$.

It is preferred that a support material, most preferably, an inorganic oxide, has a surface area in the range of from about 10 $m^2/g$ to about 700 $m^2/g$, pore volume in the range of from about 0.1 cc/g to about 4.0 cc/g, and average particle size in the range of from about 5 µm to about 500 µm. More preferably, the surface area of a support material is in the range of from about 50 $m^2/g$ to about 500 $m^2/g$, pore volume of from about 0.5 cc/g to about 3.5 cc/g, and average particle size of from about 10 µm to about 200 µm. Most preferably, the surface area of a support material is in the range of from about 100 $m^2/g$ to about 400 $m^2/g$, pore volume from about 0.8 cc/g to about 3.0 cc/g, and average particle size is from about 5 µm to about 100 µm. The average pore size of a support material useful in at least one embodiment of the present disclosure is in the range of from 10 to 1,000 Å, preferably, 50 to about 500 Å, and most preferably, 75 to about 350 Å. In some embodiments, a support material is a high surface area, amorphous silica (surface area ≥300 $m^2/gm$, pore volume ≥1.65 $cm^3/gm$), and is marketed under the trade names of DAVISON 952 or DAVISON 955 by the Davison Chemical Division of W. R. Grace and Company, are particularly useful. In other embodiments, DAVIDSON 948 is used.

In at least one embodiment of the present disclosure, a support material may be dry, that is, free of absorbed water. Drying of the support material can be achieved by heating or calcining at about 100° C. to about 1000° C., preferably, at least about 600° C. When a support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In several classes of embodiments, the above two catalysts (represented by I and II) described herein are generally deposited on a support material at a loading level of 10-100 micromoles of metal per gram of solid support; alternatively 20-80 micromoles of metal per gram of solid support; or 40-60 micromoles of metal per gram of support. But greater or lesser values may be used provided that the total amount of solid complex does not exceed the support's pore volume.

Activators

The catalyst systems (which can be supported on one or more support materials) can include activators and be combined in any manner known in the art. Activators are defined to be any compound which can activate any one of the catalyst compounds described above by converting the neutral metal catalyst compound to a catalytically active metal catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, 6-bound, metal ligand making the metal catalyst compound cationic and providing a charge-balancing non-coordinating or weakly coordinating anion.

Alumoxane Activators

Alumoxane activators can be utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), some embodiments select the maximum amount of activator typically at up to a 5000-fold molar excess Al/M over one of the catalyst compounds (per metal catalytic site). The minimum activator-to-catalyst-compound is a 1:1 molar ratio. Alternate preferred ranges include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. Preferably, alumoxane is present at zero mol %, alternatively the alumoxane is present at a molar ratio of aluminum to catalyst compound transition metal less than 500:1, preferably less than 300:1, preferably less than 100:1, and preferably less than 1:1.

Non Coordinating Anion Activators

A non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals can include aluminum, gold, and platinum. Suitable metalloids can include boron, aluminum, phosphorus, and silicon.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

Activation may be performed using non-coordinating anions (NCAs) of the type, for example, described in EP 277 003 A1 and EP 277 004 A1. NCA may be added in the form of an ion pair using, for example, [DMAH]+[NCA]− in which the N,N-dimethylanilinium (DMAH) cation reacts with a basic leaving group on the transition metal complex to form a transition metal complex cation and [NCA]−. The cation in the precursor may, alternatively, be trityl ((Ph)$_3$C$^+$). Alternatively, the transition metal complex may be reacted with a neutral NCA precursor, such as B(C$_6$F$_5$)$_3$, which abstracts an anionic group from the complex to form an activated species. Useful activators include N,N-dimethylanilinium tetrakis (pentafluorophenyl)borate (i.e., [PhNMe$_2$H]B(C$_6$F$_5$)$_4$) and N,N-dimethylanilinium tetrakis (heptafluoronaphthyl)borate, where Ph is phenyl, and Me is methyl.

Optional Scavengers or Co-Activators

In addition to the activators, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, diethyl zinc, tri-n-butylaluminum, diisobutylaluminum hydride, or combinations thereof.

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or C$_6$-C$_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-isoprenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=C$_6$F$_5$).

Preferred aluminum scavengers include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula ((R$_z$—Al—)$_y$O—)$_x$, wherein z is 1-2, y is 1-2, x is 1-100, and R is a C$_1$-C$_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two catalyst types can be combined to form a mixed catalyst system. The two or more metal catalysts can be added together in a desired ratio when combined, contacted with an activator, or contacted with a support material or a supported activator. The metal catalyst compounds may be added to the mixture sequentially or simultaneously. The molar ratio of a catalyst represented by formula (I) to a catalyst represented by formula (II) can vary depending on the balance of processability versus physical characteristics of the desired polymer. For example, the molar ratio (I):(II) can range from 20:1 to 1:1, such as from 1:1 to 20:1, such as from 1:1 to 3:1, such as from 0.6:0.4 to 0.8:0.2, for example 0.7:0.3.

More complex procedures for combining the catalysts are possible, such as addition of a first metal catalyst compound to a slurry including a support or a supported activator mixture for a specified reaction time, followed by the addition of the second metal catalyst compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal catalyst compound may be supported via contact with a support material for a reaction time. The resulting supported catalyst composition may then be mixed with mineral oil to form a slurry, which may or may not include an activator. The slurry may then be admixed with a second metal catalyst compound prior to introduction of the resulting mixed catalyst system to a polymerization reactor. The second metal catalyst compounds may be admixed at any point prior to introduction to the reactor, such as in a polymerization feed vessel or in-line in a catalyst delivery system.

The mixed catalyst system may be formed by combining a first metal catalyst compound (for example a metal catalyst compound useful for producing a first polymer attribute, such as a high molecular weight polymer fraction) with a support and activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal catalyst compound, followed by, or simultaneous to combining with a second metal catalyst compound (for example, a metal catalyst compound useful for producing a second polymer attribute, such as a low molecular weight polymer fraction or low comonomer content), either in a diluent or as the dry solid compound, to form a supported activated mixed catalyst system ("mixed catalyst system"). The mixed catalyst system thus produced may be a supported and activated first metal catalyst compound in a slurry, the slurry comprising mineral or silicon oil, with a second metal catalyst compound that is not supported and not combined with additional activator, where the second metal catalyst compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils are those that exclude moieties that are reactive with metallocene catalysts, examples of which include hydroxyl and carboxyl groups.

The diluent may comprise a blend of a mineral, silicon oil, and/or a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the first metal catalyst compound is combined with an activator and a first diluent to form a catalyst slurry that is then combined with a support material. Until such contact is made, the support particles are preferably not previously activated. The first metal catalyst compound can be in any desirable form such as a dry powder, suspension in a diluent, solution in a diluent, liquid, etc. The catalyst slurry and support particles are then mixed thoroughly, in one embodiment at an elevated temperature, so that both the first metal catalyst compound and the activator are deposited on the support particles to form a support slurry.

After the first metal catalyst compound and activator are deposited on the support, a second metal catalyst compound may then be combined with the supported first metal catalyst compound, wherein the second is combined with a diluent comprising mineral or silicon oil by any suitable means either before, simultaneous to, or after contacting the second metal catalyst compound with the supported first metal catalyst compound. In one embodiment, the first metal catalyst compound is isolated from the first diluent to a dry state before combining with the second metal catalyst compound. Preferably, the second metal catalyst compound is not activated, that is, not combined with any activator, before being combined with the supported first metal catalyst compound. The resulting solids slurry (including both the supported first and second metal catalyst compounds) is then preferably, mixed thoroughly at an elevated temperature.

A wide range of mixing temperatures may be used at various stages of making the mixed catalyst system. For example, in a specific embodiment, when the first metal catalyst compound and at least one activator, such as methylalumoxane, are combined with a first diluent to form a mixture, the mixture is preferably, heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the first metal catalyst compound deposited thereto. The first diluent can then be removed from the first support slurry to provide a dried supported first catalyst compound. For example, the first diluent can be removed under vacuum or by nitrogen purge.

Next, the second metal catalyst compound is combined with the activated first metal catalyst compound in the presence of a diluent comprising mineral or silicon oil in one embodiment. Preferably, the second metal catalyst compound is added in a molar ratio to the first metal catalyst compound in the range from 20:1 to 1:1, such as from 1:1 to 20:1, such as from 1:1 to 3:1, such as from 0.6:0.4 to 0.8:0.2, for example 0.7:0.3. Most preferably, the molar ratio is approximately 1:1. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

The first diluent is an aromatic or alkane, preferably, hydrocarbon diluent having a boiling point of less than 200° C. such as toluene, xylene, hexane, etc., may be removed from the supported first metal catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator(s)) in one embodiment. The catalyst compound may be the first or second compound, typically the second compound.

Polymerization Process

In embodiments herein, the present disclosure provides polymerization processes where monomer (such as ethylene), and, optionally, comonomer (such as hexene), are contacted with a catalyst system comprising a catalyst compound represented by formula (I), a catalyst compound represented by formula (II), an activator, and an optional support material as described above.

It has been discovered that the melt index ratio (MIR) of polymers formed during a polymerization process, such as a gas phase polymerization, utilizing a catalyst system of the present disclosure can be controlled by the amount of comonomer (mol %) used. For example, MIR can be increased by increasing the mol % of a comonomer, such as hexene, as compared to a polymerization process using less comonomer. In at least one embodiment, a polymer formed by a polymerization process of the present disclosure has a melt index ratio of from 25 to 125, such as from 25 to 50, such as from 80 to 110.

Melt index ratio (MIR) is Melt Index (MI) divided by High Load Melt Index (HLMI) as determined by ASTM D1238. Melt index (MI), also referred to as I2, reported in g/10 min, is determined according to ASTM D1238, 190° C., 2.16 kg load. High load melt index (HLMI), also referred to as I21, reported in g/10 min is determined according to ASTM D1238, 190° C., 21.6 kg load.

It has also been discovered that MIR can be controlled while increasing the activity of the hydroindenyl metallocene represented by formula (I) without substantially changing the comonomer content of the polymer formed under the polymerization conditions. This advantage provides polyolefins having a density of, for example, 0.92 to 0.94 g/cm$^3$ and a high comonomer content, such as from 6 wt % to 10 wt %. This density range provides stiffness to the polymer while maintaining the advantageous comonomer content which adds toughness.

Monomers useful herein include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment of the disclosure, the monomers comprise ethylene and, optional, comonomers comprising one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In at least one embodiment, one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

In at least one embodiment, a diolefin monomer includes any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment, a process provides polymerization of ethylene and at least one comonomer having from 3 to 8 carbon atoms, preferably, 4 to 8 carbon atoms. Particularly, the comonomers are propylene, 1-butene, 4-methyl-1-pentene, 3-methyl-1-pentene, 1-hexene and 1-octene, the most preferred being 1-hexene, 1-butene and 1-octene.

In a particularly preferred embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and combinations thereof.

Polymerization processes of the present disclosure can be carried out in any manner known in the art. Any suspension, homogeneous, bulk, solution, slurry, and/or gas phase polymerization process known in the art can be used. Such processes can be run in a batch, semi-batch, or continuous mode. Gas phase polymerization processes and slurry processes are preferred. (A homogeneous polymerization process preferably is a process where at least 90 wt % of the product is soluble in the reaction media.) A bulk homogeneous process is particularly preferred. (A bulk process is preferably a process where monomer concentration in all feeds to the reactor is 70 vol % or more.) Alternatively, no solvent or diluent is present or added in the reaction medium (except for the small amounts used as the carrier for the catalyst system or other additives, or amounts typically found with the monomer; e.g., propane in propylene).

In another embodiment, the process is a slurry process. As used herein, the term "slurry polymerization process" includes a polymerization process where a supported catalyst is utilized and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

In at least one embodiment, a preferred polymerization process is referred to as a particle form polymerization, or a slurry process, where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those using a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isohexane or as a dry free flowing powder, is injected regularly to the reactor loop, which is itself filled with circulating slurry of growing polymer particles in a diluent of isohexane containing monomer and comonomer. Hydrogen, optionally, may be added as a molecular weight control. (In one embodiment hydrogen is added from 50 ppm to 500 ppm, such as from 100 ppm to 400 ppm, such as 150 ppm to 300 ppm.)

The reactor may be maintained at a pressure of 2,000 kPa to 5,000 kPa, such as from 3620 kPa to 4309 kPa, and at a temperature in the range of about 60° C. to about 120° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isohexane diluent and all unreacted monomer and comonomers. The resulting hydrocarbon free powder is then compounded for use in various applications.

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, et al., Ind. Eng, Chem. Res. 2000, 29, 4627. Generally solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., preferably from about 10° C. to about 150° C., more preferably from about 40° C. to about 140° C., more preferably from about 50° C. to about 120° C. and at pressures of about 0.1 MPa or more, preferably 2 MPa or more. The upper pressure limit is not critically constrained but typically can be about 200 MPa or less, preferably, 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Polyolefin Products

The present disclosure further provides for compositions that can be produced by the methods of the present disclosure. In a preferred embodiment, a process described herein produces ethylene homopolymers or ethylene copolymers, such as ethylene-alpha-olefin (preferably $C_3$ to $C_{20}$) copolymers (such as ethylene-butene copolymers, ethylene-hexene and/or ethylene-octene copolymers).

Likewise, methods of the present disclosure can provide ethylene copolymers. In a preferred embodiment, the copolymers produced herein have from 0 to 25 wt % (alternatively from 0.5 to 20 wt %, alternatively from 1 to 15 wt %, preferably from 3 to 10 wt %) of one or more $C_3$ to $C_{20}$ olefin comonomer, such as a $C_3$-$C_{20}$ alpha-olefin, (preferably $C_3$ to $C_{12}$ alpha-olefin, preferably propylene, butene, hexene, octene, decene, dodecene, preferably propylene, butene, hexene, octene).

In a preferred embodiment, an ethylene alpha-olefin copolymer has a comonomer content of from 1 wt % to 15 wt % comonomer (such as hexene), such as 7 wt % or greater, such as from 1 wt % to 10 wt %, such as from 6 wt % to 10 wt %.

In at least one embodiment, an ethylene alpha-olefin copolymer has a density of from 0.880 g/cc to 1 g/cc, such as from 0.910 g/cc to 0.960 g/cc, such as from 0.920 g/cc to 0.940 g/cc, for example about 0.930 g/cc. In at least one embodiment, an ethylene alpha-olefin copolymer has a melt index from 0.5 to 5, such as from 1 to 2. In at least one embodiment, an ethylene alpha-olefin copolymer has a melt index ratio from 25 to 125, such as from 25 to 50, such as from 80 to 110.

In a preferred embodiment, an ethylene alpha-olefin copolymer has: 1) at least 50 mol % ethylene; and 2) a density of 0.910 g/cc or greater, preferably 0.935 g/cc or greater (ASTM 1505). Preferably, the copolymer has higher comonomer (e.g., hexene) content in the higher molecular weight (Mw) component of the resin as compared to the lower molecular weight (Mw) component, as determined by GPC-4D.

The copolymer produced herein typically has a composition distribution breadth $T_{75}$-$T_{25}$, as measured by TREF, that is greater than 20° C., preferably greater than 30° C., preferably greater than 40° C. The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

Typically, the polymers produced herein have an Mw of 5,000 to 1,000,000 g/mol (such as 25,000 to 750,000 g/mol, such as 50,000 to 500,000 g/mol, such as 75,000 to 200,000), and/or an Mw/Mn of greater than 1 to 40 (such as from 1.2 to 20, such as from 2 to 15, such as from 5 to 12, such as from 7 to 11, such as from 8 to 10) as determined by GPC-4D. Furthermore, the ratio of other average molecular weights can also be calculated to highlight how the molecular weight distribution is affected. For instance, a trace amount of very high molecular weight species in a polymer product can raise Mz more than Mw and, therefore, result in a significantly higher ratio of Mz/Mw. Such difference in the effect on MWD has been discovered to have profound effects on film toughness, such as tear property, through molecular orientation during the fabrication process. Polymers of the present disclosure can have an Mz/Mw value of from 1 to 10, such as from 2 to 6, such as from 3 to 5. Polymers of the present disclosure can have an Mz/Mn from about 1 to 10, such as from 2 to 6, such as from 3 to 5.

In a preferred embodiment, the polymer produced herein has a unimodal or multimodal molecular weight distribution as determined by Gel Permeation Chromatography (GPC). By "unimodal" is meant that the GPC trace has one peak or two inflection points. By "multimodal" is meant that the GPC trace has at least two peaks or more than 2 inflection points. An inflection point is that point where the second derivative of the curve changes in sign (e.g., from negative to positive or vice versa).

In at least one embodiment of the present disclosure, when:
1) the compound represented by formula (I) is run under the same polymerization conditions as a supported two catalyst composition described herein, except that the compound represented by formula (II) is absent, a polymer having a comonomer content (hexene) of 6.1 wt % and density of 0.92 g/cc is produced, and 2) the compound represented by formula (II) is run under the same polymerization conditions as step 1), except that the compound represented by formula (II) is absent, a polymer having a comonomer content (hexene) of about 0 wt % is produced.

In at least one embodiment of the present disclosure, a linear low density polyethylene may be produced by using the catalyst systems described herein (e.g., having activator and two catalysts represented by formula (I) and formula (II) supported on the same support) where the LDPE has: a) a melt index of 0.5 or greater, a density of 0.92 g/cm³ or greater, a melt index ratio of 90 or greater, and a comonomer content (hexene) of 7 wt % or greater; or b) a melt index of 1.5 or less, a density of 0.92 g/cm³ or greater, a melt index ratio of 50 or less, and a comonomer content (hexene) of 7 wt % or greater.

In a preferred embodiment, the polymer produced herein has a bimodal molecular weight distribution as determined by Gel Permeation Chromatography (GPC). By "bimodal" is meant that the GPC trace has two peaks or three or four inflection points (depending on the extent of separation of the peaks).

In another embodiment, the polymer produced herein has two peaks in the TREF measurement (see below). Two peaks in the TREF measurement means the presence of two distinct normalized IR response peaks in a graph of normalized IR response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature is caused by material that remains soluble at the lowest elution temperature. Two peaks on such a graph indicates a bimodal composition distribution. An alternate method for TREF measurement can be used if the method below does not show two peaks, i.e., see B. Monrabal, "Crystallization Analysis Fractionation: A New Technique for the Analysis of Branching Distribution in Polyolefins," Journal of Applied Polymer Science, Vol. 52, 491-499 (1994).

TREF Method

Temperature Rising Elution Fractionation (TREF) analysis is done using a Crystallization Elution Fractionation (CEF) instrument from Polymer Char, S.A., Valencia, Spain. The principles of CEF analysis and a general description of the particular apparatus used are given in the article Monrabal, B.; del Hierro, P. *Anal. Bioanal. Chem.* 2011, 399, 1557. FIG. 3 of the article is an appropriate schematic of the particular apparatus to be used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-µm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 µm), which is back-flushed after every filtration. The filtrate was then used to completely fill a 200-µl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to OM gm/mole. The MW at each elution volume is calculated with the following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}=0.67$ and $K_{PS}=0.000175$ while $\alpha$ and K are for other materials as calculated and published in literature (Sun, T. et al. *Macromolecules* 2001, 34, 6812), except that for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and $\alpha$ is 0.695 and K is $0.000579*(1-0.0077*w2b)$ for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1000TC (bulk $CH_3$end/1000TC) is obtained by weight-averaging the chain-end correction over the molecular-weight range. Then $$w2b = f*\text{bulk } CH_3/1000TC$$

$$\text{bulk SCB/1000TC} = \text{bulk CH3/1000TC} - \text{bulk CH3end/1000}TC$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as $$g'_{vis} = \frac{[\eta]_{avg}}{K M_v^\alpha},$$

where $M_V$ is the viscosity-average molecular weight based on molecular weights determined by LS analysis and the K and $\alpha$ are for the reference linear polymer, which are, for purposes of the present disclosure, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200 w2}{-100n - 2w2 + nw2}.$$

Then the molecular-weight distribution, W(z) where z=$\log_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz,$$

and a modified weight-average molecular weight ($M_w'$) is calculated over the effectively reduced range of molecular weights as follows:

$$M_w' = \int_{-\infty}^{\infty} 10^Z * W' dz.$$

The RCI,m is then computed as $$RCI,m = \int_{-\infty}^{\infty} x2(10^Z - M_w') W' dz.$$

A reversed-co-monomer index (RCI,w) is also defined on the basis of the weight fraction co-monomer signal (w2/100) and is computed as follows:

$$RCI,w = \int_{-\infty}^{\infty} \frac{w2}{100}(10^z - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

$$CDR\text{-}2, w = \frac{w2(Mz)}{w2\left(\frac{Mw+Mn}{2}\right)},$$

$$CDR\text{-}3, w = \frac{w2\left(\frac{Mz+Mw}{2}\right)}{w2\left(\frac{Mw+Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$CDR\text{-}1, m = \frac{x2(Mz)}{x2(Mw)},$$

$$CDR\text{-}2, m = \frac{x2(Mz)}{x2\left(\frac{Mw+Mn}{2}\right)},$$

$$CDR\text{-}3, m = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

An "in-situ polymer composition" (also referred to as an "in-situ blend" or a "reactor blend") is the composition which is the product of a polymerization with two catalyst compounds in the same reactor described herein. Without wishing to be bound by theory it is thought that the two catalyst compounds produce a reactor blend (i.e., an interpenetrating network) of two (or more) components made in the same reactors (or reactions zones) with the two catalysts. These sorts of compositions may be referred to as reactor blends, although the term may not be strictly accurate since there may be polymer species comprising components produced by each catalyst compound that are not technically a blend.

An "ex-situ blend" is a blend which is a physical blend of two or more polymers synthesized independently and then subsequently blended together typically using a melt-mixing process, such as an extruder. An ex-situ blend is distinguished by the fact that the polymer components are collected in solid form after exiting their respective synthesis processes, and then combined to form the blend; whereas for an in-situ polymer composition, the polymer components are prepared within a common synthesis process and only the combination is collected in solid form.

In at least one embodiment, the polymer composition produced is an in-situ polymer composition.

In at least one embodiment, the polymer produced is an in-situ polymer composition having an ethylene content of 70 wt % or more, preferably 80 wt % or more, preferably 90 wt % or more and/or a density of 0.910 or more, alternatively 0.93 g/cc or more; alternatively 0.935 g/cc or more, alternatively 0.938 g/cc or more.

In at least one embodiment of the present disclosure, the polymer produced is an in-situ polymer composition having a density of 0.910 g/cc or more, alternatively from 0.935 to 0.960 g/cc.

In at least one embodiment of the present disclosure, a polymer produced comprises ethylene and one or more comonomers and the polymer has: an RCI,m greater than 30 (such as from 150 to 500, such as from 300 to 450, such as from 400 to 500, such as from 150 to 250), a CDR-2,m of from 1 to 4 (such as from 1.5 to 3.5), an Mw/Mn of greater than 3, and optionally a $T_{75}$-$T_{25}$ of from 15 to 50° C. (such as from 25 to 45° C.).

In at least one embodiment, a polymer of the present disclosure has a PDI of from 1 to about 15, such as from 4 to 12, preferably from 8 to 11.

In at least one embodiment, a polymer of the present disclosure has a low degree of internal unsaturation. In at least one embodiment, a polymer has an internal unsaturation of less than 50% of the total unsaturations, such as less than 40% preferably less than 30%. Internal unsaturation can be decreased by increasing the amount of the catalyst represented by formula (I) (as compared the amount of the catalyst represented by formula (II)) in a catalyst system of the present disclosure. Polymers having a high degree of internal unsaturation can provide a low content of long chain branching, such as g'vis of 0.95 or more. Internal unsaturation can disrupt the crystallization of ethylene chains and contribute to the amorphous phase of the PE resin which may contribute to stronger mechanical properties in the film.

Polymers of the present disclosure can also have a high degree of terminal unsaturation, e.g. vinylogous end groups. In at least one embodiment, a polymer has a terminal unsaturation of 50% or more of the total unsaturations, preferably 60% or more, preferably 70% or more, alternately from 50 to 90%, from 60 to 85%, from 60 to 80%. Terminal unsaturation can be promoted by increasing the amount of the catalyst represented by formula (II) (as compared the amount of the catalyst represented by formula (I)) in a catalyst system of the present disclosure. Terminal unsaturation can provide reactive end groups of polymers for functionalization.

In at least one embodiment, a polymer of the present disclosure has a combination of internal and terminal unsaturation of 0.7 or greater unsaturations per 1000 carbon atoms, such as 0.8 or greater, preferably 0.9 or greater.

In at least one embodiment, a polymer of the present disclosure has a ratio of terminal unsaturation to internal unsaturation of from 1:5 to 20:1, such as from 5:1 to 20:1, such as from 8:1 to 12:1, preferably about 9:1.

Unsaturation (internal and terminal) in a polymer can be determined by $^1$H NMR with reference to *Macromolecules* 2014, 47, 3782 and *Macromolecules* 2005, 38, 6988, but in event of conflict *Macromolecules* 2014, 47, 3782 shall control. Peak assignments are determined referencing the solvent of tetrachloroethane-1,2 $d_2$ at 5.98 ppm. Specifically, percent internal unsaturation is determined by adding Vy1+Vy2+trisubstituted olefins then dividing by total unsaturation.

In at least one embodiment, a polymer of the present disclosure has a g'vis of greater than 0.9, such as greater than 0.92, preferably greater than 0.95.

In at least one embodiment, a polymer of the present disclosure has a RCI,m greater than 50, such as greater than 55, preferably greater than 60.

Blends

The polymer compositions produced herein may be further blended with additional ethylene polymers and/or propylene polymers (referred to as "second ethylene polymers" or "second ethylene copolymers") and used in film, molded part and other typical polyethylene applications.

In one aspect of the present disclosure, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the second ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

End Uses

The multi-modal polyolefin produced by the processes disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

EXAMPLES $^1$H NMR

Unless otherwise noted, $^1$H NMR data was collected at 120° C. using a 10 mm CryoProbe with a Bruker spectrometer at a $^1$H frequency of 400 MHz (available from Bruker Corporation, United Kingdom). Data were recorded using a maximum pulse width of 45°, 5 seconds between pulses and signal averaging 512 transients. Samples were prepared by dissolving 80 mg of sample in 3 mL of solvent heated at 140° C. Peak assignments are determined referencing the solvent of tetrachloroethane-1,2 d$_2$ at 5.98 ppm.

All molecular weights are weight average (Mw) unless otherwise noted. All molecular weights are reported in g/mol unless otherwise noted. Melt index (MI) also referred to as I$_2$, reported in g/10 min, is determined according to ASTM D1238, 190° C., 2.16 kg load. High load melt index (HLMI) also referred to as I$_{21}$, reported in g/10 min, is determined according to ASTM D1238, 190° C., 21.6 kg load. Melt index ratio (MIR) is MI divided by HLMI as determined by ASTM D1238.

Examples

TABLE 1

| Catalyst # | Structure | Name |
| --- | --- | --- |
| 5 | | (Tetrahydroindenyl) (trimethylsilyl-methylcyclopentadienyl) hafnium dichloride |

TABLE 1-continued

| Catalyst # | Structure | Name |
| --- | --- | --- |
| 1 | | 2,6-Bis-[1-(2-chloro-4,6-dimethylphenylimino)ethyl]pyridine iron dichloride |

All anhydrous solvents were purchased from Fisher Chemical and were degassed and dried over molecular sieves prior to use. Deuterated solvents were purchased from Cambridge Isotope Laboratories and dried over molecular sieves prior to use. 2-chloro-4,6-dimethyl aniline, 2,6-diacetylpyridine, iron chloride and formic acid (95-97%) were purchased from Sigma-Aldrich and used as received. The $^1$H NMR measurements were recorded on a 400 MHz Bruker spectrometer.

Synthesis of 2,6-Bis-[1-(2-chloro,4,6-dimethylphenylimino)ethyl]pyridine 2,6-diacetylpyridine (5.0 g, 31 mmol) was dissolved in methanol (100 mL) and to this 2-chloro-4,6-dimethyl aniline (9.537 g, 62 mmol) and formic acid (0.5 mL) were added. The resulting mixture was stirred at room temperature for 48 hours, colorless solid precipitated out during the course of reaction. Colorless crystalline solids were filtered out and washed with cold methanol. $^1$H NMR spectrum of the crude product showed a 1:1 ratio of title precursor compound and starting material 2-chloro-4,6-dimethyl aniline. The title compound was purified by column chromatography with a mixture of hexane/ethyl acetate (8:2 ratio) as eluent and solvent removal resulted colorless crystalline solid title compound (2,6-Bis-[1-(2-chloro,4,6-dimethylphenylimino)ethyl]pyridine) in 2.5 g (18.6%) yield. $^1$H NMR (400 MHz, CD2Cl2): δ 2.06 (6H, s, $CH_3$), 2.29 (6H, s, $CH_3$), 2.31 (6H, s, $CH_3$), 6.99 (2H, s, Ar—CH), 7.11 (2H, s, Ar—CH), 7.95 (1H, t, Ar—CH), 8.47 (2H, d, Ar—CH) ppm.

Synthesis of 2,6-Bis-[1-(2-chloro,4,6-dimethylphenylimino)ethyl]pyridine iron dichloride 2,6-Bis-[1-(2-chloro,4,6-dimethylphenylimino)ethyl] pyridine was dissolved in tetrahydrofuran (40 mL) and cooled to −25° C. To this solution, iron chloride was added. The resulting mixture was stirred overnight at room temperature. The mixture color turned from brown to blue during the course of the reaction, and the expected iron complex precipitated as a blue solid. The blue solid was filtered and washed with hexane. The solid was re-dissolved in dichloromethane to remove any insoluble iron containing impurities and ionic compounds formed during the course of reaction, which could not be identified by $^1$H NMR measurements because of their faster relaxation rate (paramagnetic nature) on an NMR timescale. Solvent removal under reduced pressure provided blue crystalline solid of the title iron compound (2,6-Bis-[1-(2-chloro,4,6-dimethylphenylimino)ethyl]pyridine iron dichloride) in 1.89 g (81.9%) yield. $^1$H NMR (400 MHz, $CD_2Cl_2$): δ −23.2, −21.0, 3.7, 9.1, 12.2, 15.3, 18.4, 19.3, 22.0, 22.2, 32.9, 33.9, 81.9, 84.2 (bs) ppm.

Preparation of (Tetrahydroindenyl)(trimethylsilylmethylcyclopentadienyl)hafnium dichloride, ($H_4$Ind)($Me_3SiCH_2Cp$)$HfCl_2$ To a pale yellow solution of indenyl(trimethylsilylmethylcyclopentadienyl)hafnium dichloride (1.50 g, 2.91 mmol) in dichloromethane (30 mL) was added platinum oxide (0.04 g, 0.18 mmol, 2.7 wt %) to give a brown mixture. 100 psi hydrogen was added to the mixture and the reaction was stirred vigorously for 1 hour. The reaction was vented and filtered to give a colorless solution and black solid. The solution was evaporated under vacuum, leaving white solid title compound (Tetrahydroindenyl)(trimethylsilylmethylcyclopentadienyl)hafnium dichloride, ($H_4$Ind)($Me_3SiCH_2Cp$) $HfCl_2$. Yield 1.43 g (95%). $^1$H NMR ($CD_2Cl_2$): δ 6.23 (t, 1H), 6.15 (t, 2H), 5.88 (t, 2H), 5.67 (d, 2H), 2.85-2.92 (m, 2H), 2.59-2.66 (m, 2H), 2.09 (s, 2H), 1.77-1.80 (m, 2H), 1.60-1.63 (m, 2H), −0.02 (s, 9H).

Preparation of Indenyl(trimethylsilylmethylcyclopentadienyl)hafnium dichloride, Ind($Me_3SiCH_2Cp$) $HfCl_2$ To a white suspension of (trimethylsilylmethylcyclopentadienyl)hafnium trichloride (1,2-dimethoxyethane) (2.50 g, 4.75 mmol, 1.00 eq.) in ether (30 mL) was added lithium indenide (0.57 g, 4.75 mmol, 1.00 eq.) to give a light mixture. The mixture was stirred 21 hours and then evaporated under vacuum, leaving a solid. The solid was extracted with dichloromethane (25 mL, then 3×5 mL) and the extracts filtered to give a light yellow solution and white solid. The solution was evaporated under vacuum, leaving light yellow solid. The solid was washed with pentane (10 mL) and dried under vacuum to provide title compound (Indenyl(trimethylsilylmethylcyclopentadienyl)hafnium dichloride, Ind($Me_3SiCH_2Cp$)$HfCl_2$). Yield 2.27 g (93%) light yellow powder. $^1$H NMR (CD2Cl2): δ 7.65 (m, 2H), 7.26 (m, 2H), 6.87 (t, 1H), 6.37 (d, 2H), 5.77 (t, 2H), 5.65 (t, 2H), 1.99 (s, 2H), −0.06 (s, 9H).

Preparation of (Trimethylsilylmethylcyclopentadienyl)hafnium trichloride (1,2-dimethoxyethane) (($Me_3SiCH_2Cp$)$HfCl_3$(dme))

To a white suspension of hafnium tetrachloride (11.65 g, 36.4 mmol, 1.00 eq.) in dichloromethane (120 mL) at −35° C. was added dimethyl sulfide (6.80 g, 109 mmol, 3.01 eq.) to give a hazy, pale yellow solution. Tributyl(trimethylsilylmethylcyclopentadienyl)stannane (16.85 g, 38.2 mmol, 1.05 eq.) was added dropwise to the solution to give a hazy, amber solution. The mixture was allowed to warm to room temperature and stirred 3 hours. 1,2-Dimethoxyethane (10.00 g, 109 mmol, 2.99 eq.) was then added to the reaction and the mixture was filtered to give an amber solution and a small amount of white solid. The solution was evaporated under vacuum, leaving a damp, white solid. The solid was washed with pentane (100 mL, then 3×40 mL) and dried under vacuum to provide the title compound ($Me_3SiCH_2Cp$) $HfCl_3(dme)$). Yield 18.15 g (95%) white powder. $^1H$ NMR ($CD_2Cl_2$): δ 6.29 (t, 2H), 4.13 (br s, 4H), 3.91 (3, 6H), 2.33 (s, 2H), −0.01 (s, 9H).

Preparation of Tributyl(trimethylsilylmethylcyclopentadienyl)stannane, $Bu_3Sn(Me_3SiCH_2Cp)$ To a colorless solution of chlorotributylstannane (12.55 g, 38.6 mmol, 1.00 eq.) in ether (60 mL) was added lithium (trimethylsilylmethylcyclopentadienide) (6.10 g, 38.5 mmol, 1.00 eq.) to give a cloudy, light mixture. The reaction was stirred 4 hours and then dried under vacuum, leaving a mixture. The mixture was extracted with pentane (50 mL, then 2×20 mL) and extracts filtered to give a yellow solution and a solid. The solution was evaporated under vacuum, leaving yellow liquid title compound ($Bu_3Sn$ ($Me_3SiCH_2Cp$)). Yield 16.88 g (99%). $^1H$ NMR ($C_6D_6$): δ 6.08 (m, 2H), 5.56 (m, 4H), 1.99 (s, 2H), 1.51 (m, 6H), 1.33 (m, 6H), 0.92 (t, 9H), 0.83 (m, 6H), 0.09 (s, 9H).

Supported Catalyst Synthesis

SMAO is methylalumoxane supported on silica ES-70 (PQ Corporation, Conshohocken, Pa.) that has been calcined at 875° C. and was prepared as follows:

In a Celestir vessel in the drybox 55 grams methylaluminoxane (MAO) (30 wt % in toluene) was added along with 100 mL of toluene. ES-70 silica (44.0 g) that has been calcined at 875° C. was then added to the vessel and stirred for 2 hours.

(Tetrahydroindenyl)(trimethylsilylmethylcyclopentadienyl)hafnium dichloride (0.805 g, 1.68 mmol) and 2,6-bis [1-(2-chloro-4,6-dimethylphenylimino)ethyl]pyridine iron (II) dichloride (0.407 g, 0.72 mmol) were then dissolved in toluene (20 mL), then added to the Celestir vessel and stirred for 3 hours. The slurry was then filtered, washed with toluene (1×20 mL) and then hexane (2×30 mL). The supported catalyst was then dried under vacuum for 18 hours, after which 60.5 grams of light yellow supported catalyst was obtained.

Polymerization Process

Polymerizations in a continuous run gas phase reactor (R125) which is a 7 foot tall gas-phase fluidized bed reactor with a 4 foot tall 6" diameter body and a 3 foot tall 10" diameter expanded section. Cycle and feed gases were fed into the reactor body through a perforated distributor plate, and the reactor was controlled at 300 psi and 70 mol % ethylene. Reactor temperature was maintained at 185° F. by heating the cycle gas. Co-supported catalyst was fed as a 10 wt % slurry in Sono Jell® from Sonneborn (Parsippany, N.J.). The slurry was delivered to the reactor by nitrogen and isopentane feeds in a ⅛" diameter catalyst probe. Polymer was collected from the reactor as necessary to maintain the desired bed weight. Hydrogen was fed into the reactor to maintain a target gas phase concentration, and the comonomer (1-hexene) was fed in a mass flow ratio with ethylene.

TABLE 2

| | Run Condition # | |
|---|---|---|
| | Run 1 | Run 2 |
| | Catalyst 5: | Catalyst 5: |
| Catalyst # | Catalyst 1 (70:30) | Catalyst 1 (70:30) |
| Process Data | | |
| H2 conc. (molppm) | 148 | 230 |
| C6/C2 Ratio (mol %/mol %) | 0.03425 | 0.01977 |
| Comonomer conc. (mol %) | 2.40 | 1.39 |
| C2 conc. (mol %) | 70.0 | 70.2 |
| Comonomer/C2 Flow Ratio | 0.110 | 0.059 |
| H2/C2 Ratio (ppm/mol %) | 2.1 | 3.3 |
| Rx. Pressure Set Point (psig) | 300 | 300 |
| Reactor Temp SP (F.) | 185 | 185 |
| Avg. Bed weight (g) | 2382 | 2364 |
| Residence Time (hr) | 7.2 | 5.1 |
| Catalyst Slurry Feed (cc/hr) | 1.56 | 1.48 |
| Cat Activity (g poly/g cat) | 3300 | 3551 |
| Product Data | | |
| Melt Index (MI) | 1.57 | 1.29 |
| HLMI | 159.36 | 46.43 |
| HLMI/MI Ratio | 101.81 | 35.99 |
| Gradient Density | 0.9343 | 0.9316 |
| Bulk Density | 0.3227 | 0.3930 |
| Mw (g/mol) | 108457 | 112618 |
| Mn (g/mol) | 9145 | 12794 |
| Mz (g/mol) | 910226 | 322710 |
| Mz/Mn | 99.5 | 25.2 |
| Mw/Mn | 11.9 | 8.8 |
| Mz/Mw | 8.4 | 2.9 |
| Hexene wt % | 7.55 | 7.50 |
| g' (vis) | 0.872 | 0.992 |
| RCI, m (kg/mol) | 430.9 | 180.5 |
| CDR2, m | 3.21 | 1.69 |
| $T_{75}$-$T_{25}$ (° C.) | 40.8 | 29.6 |

Figure 2:
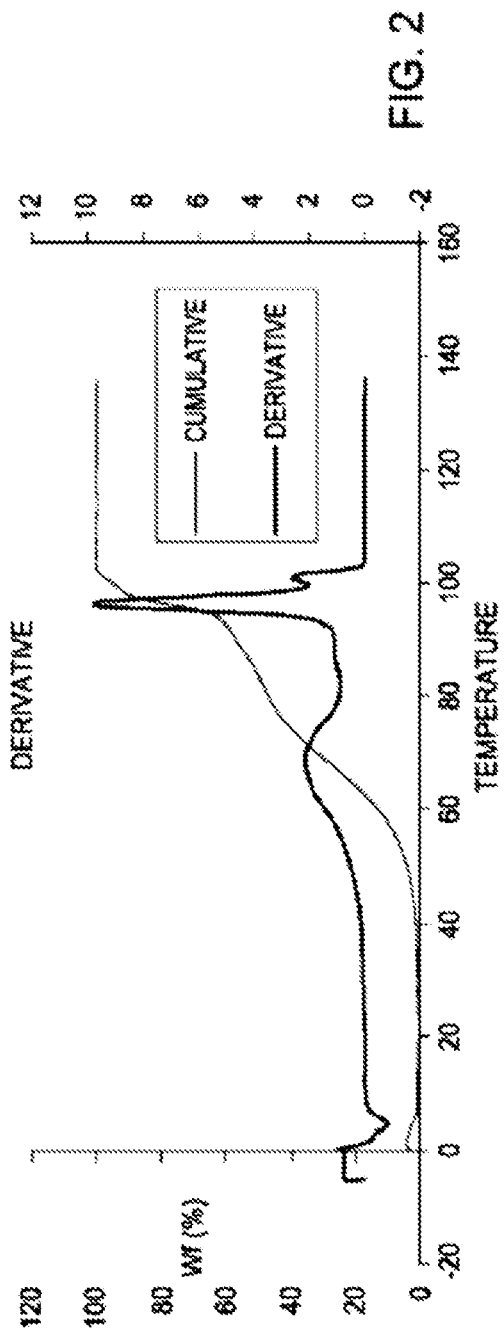
FIG. 2 is a graph illustrating a temperature rising elution fractionation curve of a mixed catalyst system under polymerization conditions, according to one embodiment.

FIG. 1 is a graph illustrating a temperature rising elution fractionation curve of a mixed catalyst system having Catalyst 5 and Catalyst 1 under Run 1 conditions. (Y-axis on the left side of the graph corresponds to the cumulative and the Y-axis on the right side of the graph corresponds to the derivative). FIG. 2 is a graph illustrating a temperature rising elution fractionation curve of a mixed catalyst system having Catalyst 5 and Catalyst 1 under Run 2 conditions. (Y-axis on the left side of the graph corresponds to the cumulative and the Y-axis on the right side of the graph corresponds to the derivative). The data illustrate that the mixed catalyst system of Catalyst 5:Catalyst 1 provides a bimodal polyethylene composition. Furthermore, under Run 1 conditions, MI values were high (1.5 and trending up) and the polymer density was 0.9343 g/cm³. Under Run 2 conditions (which had increased hexene concentration), negligible changes in polymer density were observed as compared to polymer formed under Run 1 conditions. However, increasing hexene (Run 2) provided an increased MIR value of 102 as compared to an MIR value of 36 of the polymer formed under Run 1 conditions. The reduced MIR value of 36 is coupled with a reduced split between the high and low density components (as shown in FIG. 2) as compared to the TREF spectrum of FIG. 1.

Figure 3A:
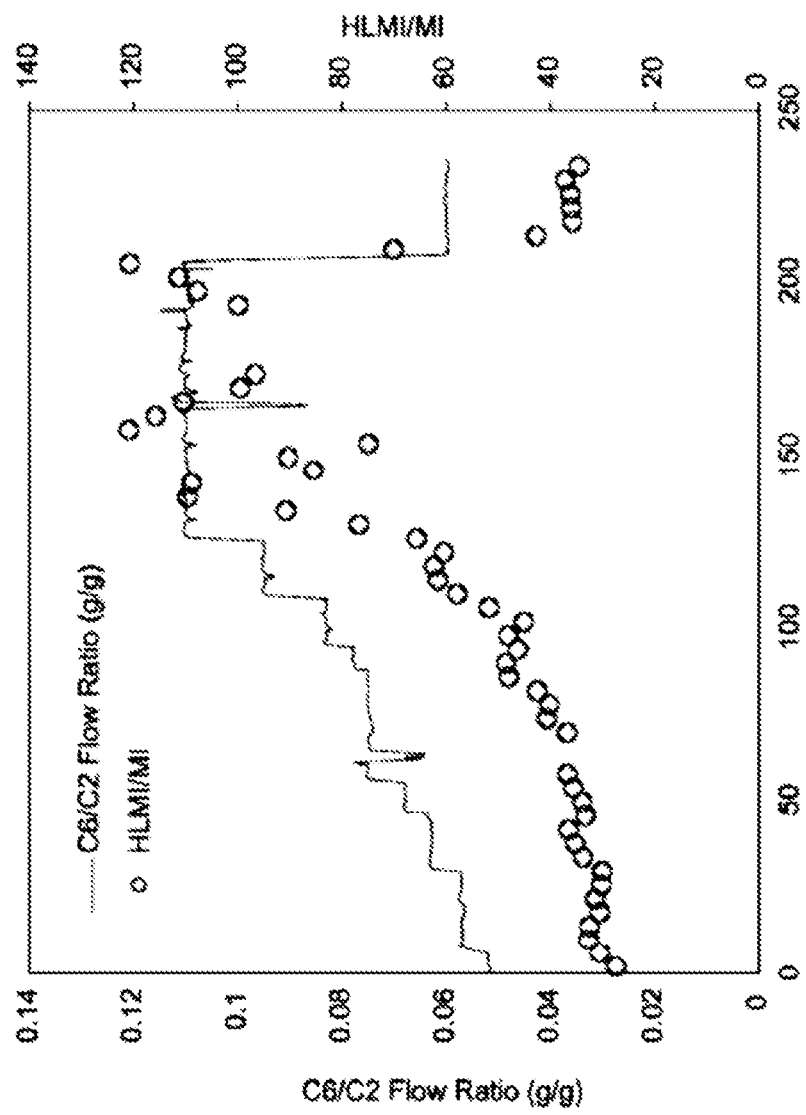
FIG. 3A is a graph illustrating MIR and C6/C2 ratio versus time (hours), according to one embodiment.
Figure 3B:
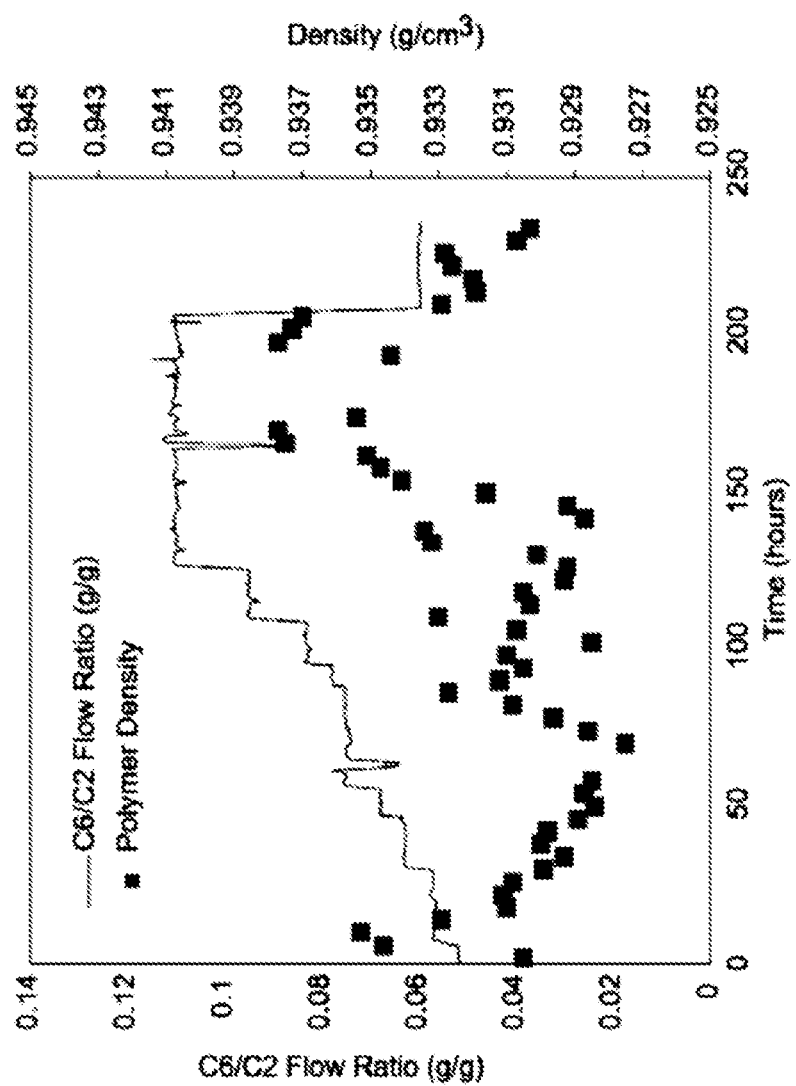
FIG. 3B is a graph illustrating C6/C2 ratio and density versus time (hours), according to one embodiment.

FIG. 3A is a graph illustrating MIR and C6/C2 ratio versus time (hours). (MIR is shown by circles and C6/C2 ratio is shown by a solid line). FIG. 3B is a graph illustrating C6/C2 ratio and density versus time (hours). (Density is shown by squares and C6/C2 ratio is shown by a solid line). FIG. 3A and FIG. 3B illustrate the influence of hexene on MIR and its limited impact on density. In a conventional polymerization, an increase in C6/C2 flow ratio can lead to lower polymer density, unlike polymerizations according to some embodiments of the present disclosure.

Figure 4:
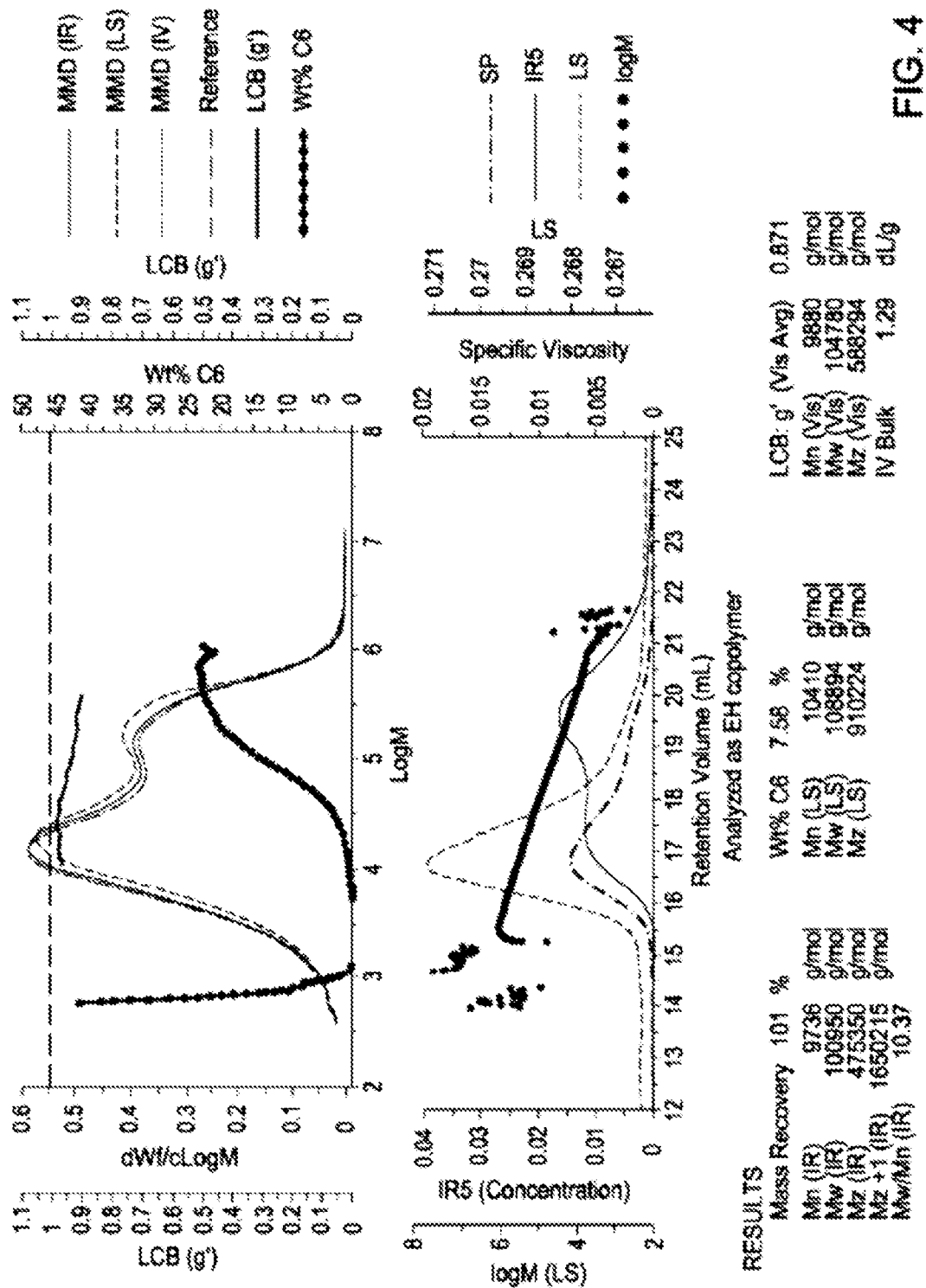
FIG. 4 is a gel permeation chromatography spectrum of an ethylene hexene copolymer formed by a catalyst system under polymerization conditions, according to one embodiment.
Figure 5:
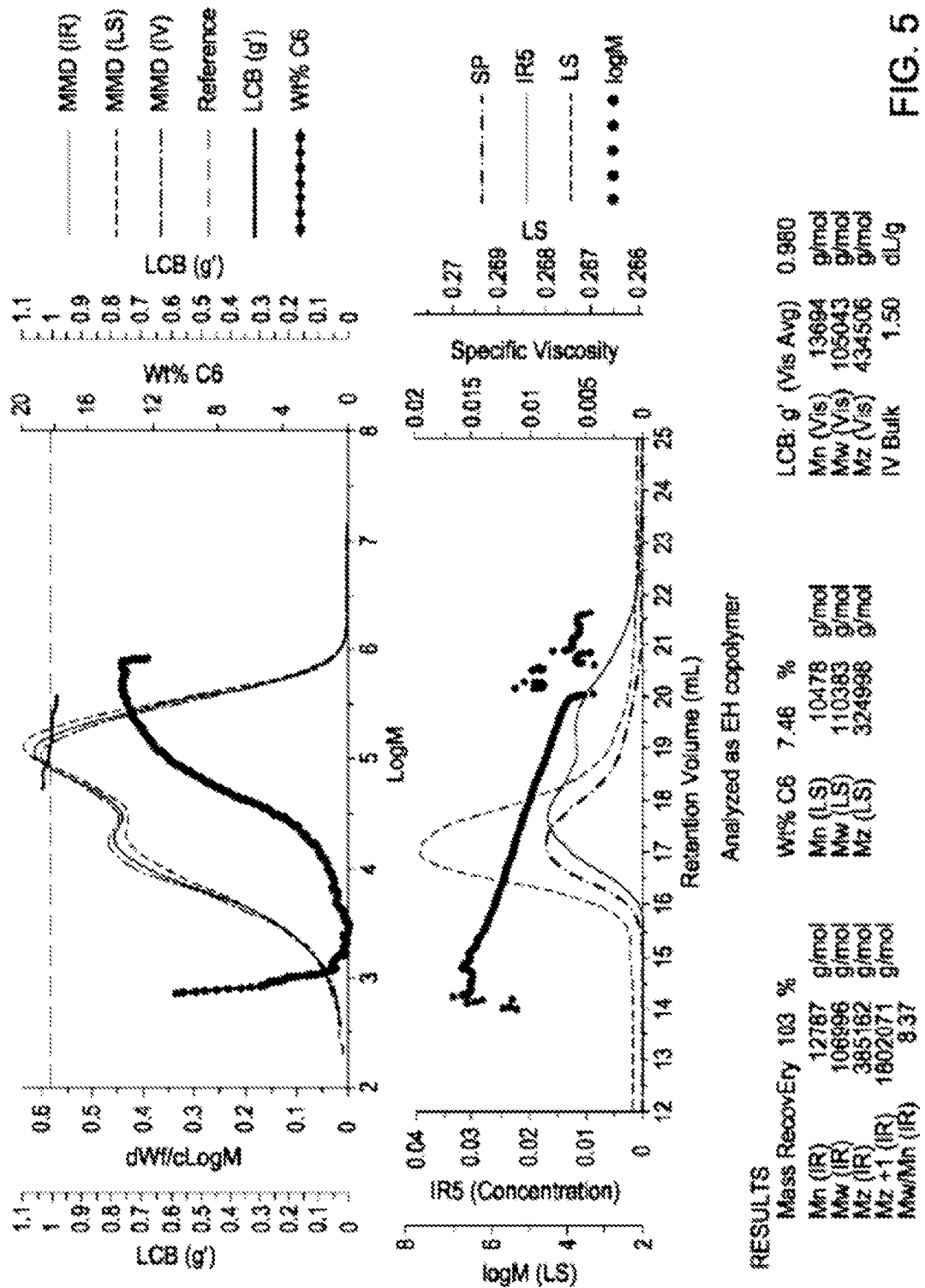
FIG. 5 is a gel permeation chromatography spectrum of an ethylene hexene copolymer formed by a catalyst system under polymerization conditions, according to one embodiment.

FIG. 4 is a gel permeation chromatography spectrum of the ethylene hexene copolymer formed by a catalyst system under Run 2 conditions. FIG. 5 is a gel permeation chromatography spectrum of the ethylene hexene copolymer formed by a catalyst system under Run 1 conditions. As shown in FIG. 4 and FIG. 5, the PDI (Mw/Mn) value of the polymer compositions increased from Run 1 to Run 2 conditions but the overall comonomer content (hexene wt %) was negligibly affected (7.46 wt % to 7.58 wt %). Furthermore, it would be expected that if the amount of hexene were increased (such as under Run 2 conditions) that the density would substantially decrease, which is not what happened. Comparatively, Catalyst 5 alone (i.e., a catalyst system without Catalyst 1) when run under the same conditions as Run 1 and Run 2 produces a polymer having a hexene content of 6.1 wt % and a density of 0.920 g/cm$^3$.

Furthermore, the activity of Catalyst 5 under Run 2 conditions was much higher as compared to Run 1 conditions, due to the increased amount of hexene of the polymerization, as evidenced by the increased fraction of low molecular weight polymer under Run 2 conditions. Furthermore, polymer produced under Run 2 conditions has reduced linearity (g'vis of 0.871), as compared to polymer produced under Run 1 conditions (g'vis of 0.98), indicating long chain branching under Run 2 conditions. Furthermore, polymer produced under both Run 1 and Run 2 conditions had a broad orthogonal composition distribution.

Unsaturation Data $^1$H NMR data was collected at 393K in a 10 mm probe using a Bruker spectrometer with a $^1$H frequency of at least 400 MHz (available from Agilent Technologies, Santa Clara, Calif.). Data was recorded using a maximum pulse width of 45° C., 5 seconds between pulses and signal averaging 512 transients. Spectral signals were integrated and the number of unsaturation types per 1000 carbons was calculated by multiplying the different groups by 1000 and dividing the result by the total number of carbons. The number average molecular weight (Mn) was calculated by dividing the total number of unsaturated species into 14,000, and has units of g/mol.

Nuclear magnetic resonance measurements of the bimodal polyethylenes revealed some unsaturations, as summarized in Table 3. The labels "Vy1", "Vy2" and "Vy5" refer to proton resonances attributed to the protons on double bonds within the polymer backbone.

TABLE 3

Level of unsaturation (internal (I) and terminal (T)) for inventive polyethylenes

| Unsaturations per 1000 carbons | Polymer of Run 1 | Polymer of Run 2 |
| --- | --- | --- |
| Vy1 and Vy2 (I) | 0.02 | 0.02 |
| Vy5 (T) | 0.02 | 0.01 |
| Tri-substituted olefins (I) | 0.03 | 0.02 |
| Vinyls (T) | 1.39 | 0.93 |
| Vinylidenes (T) | 0.00 | 0.01 |
| total internal unsaturations | 0.05 | 0.04 |
| Total unsaturations | 1.46 | 0.99 |
| % vinyl | 95.2 | 93.9 |

Overall, catalyst systems and processes of the present disclosure may provide ethylene polymers having medium density with comonomer content. The density can provide a stiff polymer (like a high density material) but is tougher because of the comonomer content. Catalyst systems and processes of the present disclosure can provide ethylene polymers having the unique properties of high stiffness, high toughness and good processability.

All documents described herein are incorporated by reference herein, including any priority documents and/or testing procedures to the extent they are not inconsistent with this text. As is apparent from the foregoing general description and the specific embodiments, while embodiments of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I'"" preceding the recitation of the composition, element, or elements and vice versa, e.g., the terms "comprising," "consisting essentially of," "consisting of" also include the product of the combinations of elements listed after the term.

What is claimed is:

1. An ethylene copolymer composition comprising 90 wt % or more of ethylene derived units and from 6 wt % to 10 wt % $C_3$ to $C_{12}$ α-olefin derived units, based on the total weight of the ethylene composition;
   wherein the ethylene copolymer composition has:
   a density within the range from 0.910 to 0.960 g/cm$^3$ and a ratio of weight average molecular weight to number-average molecular weight ($M_w/M_n$) in the range of from 3 to 12; and
   either:
   (1) a melt index ratio ($I_{21}/I_2$, 190° C.) of greater than 90 and a melt index ($I_2$, 190° C.) of greater than 1.5 g/10 min; or
   (2) a melt index ratio ($I_{21}/I_2$, 190° C.) of less than 50 and a melt index ($I_2$, 190° C.) of less than 1.5 g/10 min; and
   further wherein the ethylene copolymer composition has one or more of the following properties:
   a mole-basis reversed comonomer index (RCI,m) within the range from 150 to 500;
   a comonomer distribution ratio (CDR-2,m) within the range from 1 to 4; and
   a composition distribution breadth ($T_{75}$-$T_{25}$ value as measured by TREF) within the range from 15 to 50° C.

2. The ethylene copolymer composition of claim 1, wherein the C3 to C12 α-olefin derived units are selected from the group consisting of 1-butene, 1-hexene, 1-octene, and combinations thereof.

3. The ethylene copolymer composition of claim 1, having T75-T25 value as measured by TREF greater than 30° C.

4. The ethylene copolymer composition of claim 1, having both (1) RCI,m within the range from 150 to 500 and (2) CDR-2,m within the range from 1 to 4.

5. The ethylene copolymer composition of claim 1, further having one or more of the following properties:
   (a) weight average molecular weight ($M_w$) within the range from 75,000 to 200,000 g/mol;
   (b) ratio of z-average molecular weight to weight average molecular weight ($M_z/M_w$) within the range from 1 to 10; and
   (c) g'$_{vis}$ greater than 0.9.

6. The ethylene copolymer composition of claim 5, having all of the properties (a)-(d).

7. The ethylene copolymer composition of claim 1, having the following:
   density within the range from 0.920 to 0.940 g/cm³;
   RCI,m within the range from 300 to 450; and
   CDR-2,m within the range from 1.5 to 3.5.

8. The ethylene copolymer composition of claim 7, further having value within the range from 5 to 12.

9. The ethylene copolymer composition of claim 1, having two peaks in a TREF measurement;
   wherein both peaks are at least 3° C. apart; and
   further wherein both peaks occur at a temperature above 20° C. and below 120° C.

10. The ethylene copolymer composition of claim 1, wherein the composition comprises a combination of internal and terminal unsaturation of 0.9 or greater unsaturations per 1,000 carbon atoms and a ratio of terminal unsaturation to internal unsaturation of from 5:1 to 20:1.

11. An ethylene copolymer composition comprising 90 wt % or more of ethylene derived units and from 6 wt % to 10 wt % C3 to C12 α-olefin derived units, based on the total weight of the ethylene composition;
   wherein the ethylene copolymer composition has:
   a density within the range from 0.910 g/cm³ to 0.960 g/cm³ and a ratio of weight average molecular weight to number-average molecular weight ($M_w/M_n$) in the range of from 3 to 12;
   a mole-basis reversed comonomer index (RCI,m) within the range from 150 to 500;
   a comonomer distribution ratio (CDR-2,m) within the range from 1 to 4; and
   a composition distribution breadth (T75-T25 value as measured by TREF) within the range from 15 to 50° C.;
   and
   either:
   (1) a melt index ratio ($I_{21}/I_2$, 190° C.) of greater than 90 and a melt index ($I_2$, 190° C.) of greater than 1.5 g/10 min; or
   (2) a melt index ratio ($I_{21}/I_2$, 190° C.) of less than 50 and a melt index ($I_2$, 190° C.) of less than 1.5 g/10 min; and
   further wherein the ethylene copolymer composition is produced by polymerizing ethylene and a $C_3$ to $C_{12}$ comonomer in the presence of a catalyst system comprising the product of the combination of:
   a Group 4 metallocene catalyst represented by formula (I):

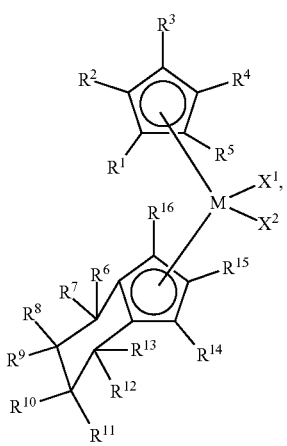

(I)

wherein:
   M is a group 4 metal,
   $X^1$ and $X^2$ are independently a univalent anionic ligand, a diene ligand, an alkylidene ligand, or $X^1$ and $X^2$ are joined to form a metallocyclic ring, and further wherein
   $R^1$, $R^2$, $R^3$, and $R^4$ are each hydrogen and $R^5$ is $R^{**}$—$SiR^*_3$, where each $R^*$ is independently $C_1$ to $C_{20}$ substituted or unsubstituted hydrocarbyl, and $R^{**}$ is $C_1$ to $C_4$ hydrocarbyl;
   each of $R^1$, $R^2$, $R^3$, $R^4$, $R^5$, $R^6$, $R^{13}$, $R^{14}$, $R^{15}$, and $R^{16}$ is independently selected from hydrogen, halogen, $C_1$-$C_{40}$ hydrocarbyl, substituted $C_1$-$C_{40}$ hydrocarbyl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^1$ and $R^2$, $R^2$ and $R^3$, $R^3$ and $R^4$, $R^4$ and $R^5$, $R^1$ and $R^5$, $R^{14}$ and $R^{15}$, and $R^{15}$ and $R^{16}$ are joined to form a saturated ring, unsaturated ring, substituted saturated ring, or substituted unsaturated ring;
   each of $R^7$, $R^8$, $R^9$, $R^{10}$, $R^{11}$, and $R^{12}$ is independently selected from hydrogen, halogen, $C_1$-$C_{40}$ hydrocarbyl, substituted $C_1$-$C_{40}$ hydrocarbyl, aryl, substituted aryl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^7$ and $R^8$, $R^8$ and $R^{10}$, and $R^{12}$ and are joined to form a saturated ring, unsaturated ring, substituted saturated ring, or substituted unsaturated ring; and
   an iron catalyst represented by formula (II):

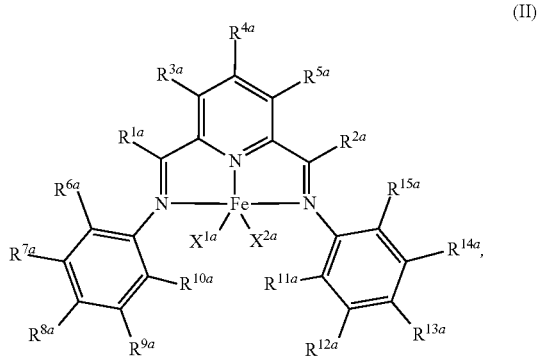

(II)

wherein:
   $R^{6a}$ and $R^{15a}$ are independently halogen, —CF$_3$, hydrogen, or $C_1$-$C_{22}$-alkyl, or —OR', each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —NR'$_2$, —OR' or —SiR"$_3$, wherein $R^{1a}$ optionally bonds with $R^{3a}$, and $R^{2a}$ optionally bonds with $R^{5a}$, in each case to independently form a five-, six- or seven-membered ring,
   each of $R^{3a}$, $R^{4a}$, $R^{5a}$, $R^{7a}$, $R^{8a}$, $R^{9a}$, $R^{10a}$, $R^{11a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, —NR'$_2$, —OR', halogen, —SiR"$_3$ or five-, six- or seven-membered heterocyclyl comprising at least one atom selected from N, P, O and S;

wherein each of $R^{3a}$, $R^{4a}$, $R^{5a}$, $R^{7a}$, $R^{8a}$, $R^{9a}$, $R^{10a}$, $R^{11a}$, $R^{12a}$, $R^{13a}$, and $R^{14a}$ is independently optionally substituted by halogen, —NR'$_2$, —OR' or —SiR"$_3$, $X^{1a}$ and $X^{2a}$ are independently halogen, hydrogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'$_2$, —OR', —SR', —SO$_3$R', —OC(O)R', —CN, —SCN, β-diketonate, —CO, —BF$_4^-$, —PF$_6^-$ or bulky non-coordinating anion, or $X^{1a}$ and $X^{2a}$ optionally bond to form a five- or six-membered ring, each R' is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or —SiR"$_3$, wherein R' is optionally substituted by halogen or nitrogen- or oxygen-containing groups, or two R' radicals optionally bond to form a five- or six-membered ring, each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, wherein each R" is optionally substituted by halogen or nitrogen- or oxygen-containing groups, or two R" radicals optionally bond to form a five- or six-membered ring.

12. The ethylene copolymer composition of claim 11, wherein the ethylene copolymer composition has a bimodal molecular weight distribution.

13. The ethylene copolymer composition of claim 11, further having one or more of the following properties:
   weight average molecular weight ($M_w$) within the range from 75,000 to 200,000 g/mol;
   ratio of z-average molecular weight to weight average molecular weight ($M_z/M_w$) within the range from 1 to 10; and
   g'$_{vis}$ greater than 0.9.

14. The ethylene copolymer composition of claim 11, wherein the composition comprises a combination of internal and terminal unsaturation of 0.9 or greater unsaturations per 1,000 carbon atoms and a ratio of terminal unsaturation to internal unsaturation of from 5:1 to 20:1.

15. The ethylene copolymer composition of claim 11, having two peaks in a TREF measurement;
   wherein both peaks are at least 3° C. apart; and
   further wherein both peaks occur at a temperature above 20° C. and below 120° C.

16. A film formed from the ethylene copolymer composition of claim 1.

17. The ethylene copolymer composition of claim 1, wherein the ethylene copolymer composition comprises a first polymer fraction having a weight average molecular weight ($M_w$) less than 100,000 g/mol and a comonomer content of 6 wt % or less based on the weight of the first polymer fraction and a second polymer fraction having a weight average molecular weight ($M_w$) greater than 100,000 g/mol and a comonomer content of greater than 6 wt % based on the weight of the second polymer fraction.

18. The ethylene copolymer composition of claim 11, wherein the ethylene copolymer composition comprises a first polymer fraction having a weight average molecular weight ($M_w$) less than 100,000 g/mol and a comonomer content of 6 wt % or less based on the weight of the first polymer fraction and a second polymer fraction having a weight average molecular weight ($M_w$) greater than 100,000 g/mol and a comonomer content of greater than 6 wt % based on the weight of the second polymer fraction.

* * * * *